US012676779B2

(12) United States Patent
Matsuda et al.

(10) Patent No.: US 12,676,779 B2
(45) Date of Patent: Jul. 7, 2026

(54) BASE STATION DEVICE, RADIO COMMUNICATION DEVICE, AND RADIO COMMUNICATION SYSTEM

(71) Applicant: Sony Group Corporation, Tokyo (JP)

(72) Inventors: Hiroki Matsuda, Saitama (JP);
Kazuyuki Shimezawa, Kanagawa (JP)

(73) Assignee: SONY GROUP CORPORATION,
Tokyo (JP)

( * ) Notice: Subject to any disclaimer, the term of this
patent is extended or adjusted under 35
U.S.C. 154(b) by 81 days.

(21) Appl. No.: 18/703,757

(22) PCT Filed: Nov. 17, 2022

(86) PCT No.: PCT/JP2022/042676
§ 371 (c)(1),
(2) Date: Apr. 23, 2024

(87) PCT Pub. No.: WO2023/095708
PCT Pub. Date: Jun. 1, 2023

(65) Prior Publication Data
US 2024/0422042 A1 Dec. 19, 2024

(30) Foreign Application Priority Data

Nov. 26, 2021 (JP) ................................ 2021-192469

(51) Int. Cl.
*H04L 27/26* (2006.01)
*H04W 72/23* (2023.01)
(52) U.S. Cl.
CPC ......... *H04L 27/2626* (2013.01); *H04W 72/23*
(2023.01)

(58) Field of Classification Search
CPC ............. H04W 72/23; H04W 72/0453; H04W
72/0446; H04W 88/06; H04W 72/1268;
(Continued)

(56) References Cited

U.S. PATENT DOCUMENTS

| | | | | |
|---|---|---|---|---|
| 2006/0039273 A1* | 2/2006 | Gore | ................... | H04L 27/0008 |
| | | | | 370/208 |
| 2011/0007784 A1* | 1/2011 | Nakamura | ........... | H04B 7/2606 |
| | | | | 455/7 |
| 2013/0329720 A1* | 12/2013 | Yu | ....................... | H04L 27/2662 |
| | | | | 370/350 |
| 2018/0294916 A1* | 10/2018 | Akkarakaran | ........ | H04L 5/0092 |

(Continued)

FOREIGN PATENT DOCUMENTS

| | | |
|---|---|---|
| JP | 2018-074488 A | 5/2018 |
| WO | WO-2019225970 A1 | 11/2019 |

(Continued)

OTHER PUBLICATIONS

DVB Organization: "Rationale sustaining the NGH Multi-FEF
proposal.pdf", Sep. 1, 2010, 3 pgs., XP017832667.
(Continued)

*Primary Examiner* — Eva Y Puente
(74) *Attorney, Agent, or Firm* — XSENSUS LLP

(57) ABSTRACT
A base station device that includes a controller that notifies
a terminal device of first information regarding a signal
waveform to be used in downlink communication in an
initial connection procedure performed with the terminal
device among a first signal waveform and a second signal
waveform and performs the downlink communication with
the signal waveform to be used based on the first informa-
tion.

18 Claims, 25 Drawing Sheets

(58) Field of Classification Search
CPC ... H04W 72/21; H04W 76/27; H04W 72/232; H04W 72/046; H04W 72/542; H04W 24/08; H04W 56/0045; H04L 27/2636; H04L 5/0007; H04L 5/0091; H04L 5/0053; H04L 5/0023; H04L 27/2646; H04L 5/0044; H04L 27/2602; H04B 17/336; H04B 17/382; H04B 7/0626; H04B 1/713; H04B 17/24; H04B 17/318; H04B 7/0619; H04B 7/0632
See application file for complete search history.

(56) References Cited

U.S. PATENT DOCUMENTS

| | | | |
|---|---|---|---|
| 2019/0261315 A1 | 8/2019 | Xiaoxia | |
| 2022/0021502 A1* | 1/2022 | Horn | H04L 5/0051 |
| 2023/0096382 A1* | 3/2023 | Levitsky | H04B 17/336 |
| | | | 370/329 |
| 2025/0267643 A1* | 8/2025 | Zeng | H04L 5/0064 |

FOREIGN PATENT DOCUMENTS

| | | |
|---|---|---|
| WO | 2021/029002 A1 | 2/2021 |
| WO | WO-2021084333 A1 | 5/2021 |
| WO | 2021/106837 A1 | 6/2021 |

OTHER PUBLICATIONS

International Search Report and Written Opinion mailed on Dec. 27, 2022, received for PCT Application PCT/JP2022/042676, filed on Nov. 17, 2022, 10 pages including English Translation.

Intel Corporation, "Procedure for 2-step RACH", 3GPP TSG RAN WG1 #96bis, R1-1904281, Agenda item: 7.2.1.2, Apr. 8-12, 2019, 7 pages.

Qualcomm Incorporated, "DL Signals and channels for NR-U", 3GPP TSG RAN WG1 Meeting #93, R1-1807387, Agenda item: 7.6.3.1, May 21-25, 2018, 11 pages.

Gatehouse, Sateliot, "Discussion on Scenarios Applicable to Nb-IoT NTN", 3GPP TSG RAN WG1 #103-e, R1-2009098, Agenda Item: 8.15.1, Oct. 26-Nov. 13, 2020, pp. 1-7.

Samsung, "RAN2 Aspect on Different Waveforms for Uplink Transmission", 3GPP TSG-RAN WG2 Meeting #98, R2-1705827, Agenda item: 10.2.2, May 15-19, 2017, 5 pages.

Samsung, "Reference Waveform for Uplink Transmission", 3GPP TSG-RAN WG2 #99bis, R2-1711805, Agenda item: 10.2.19, Oct. 9-13, 2017, 4 pages.

* cited by examiner

Fig. 18

BASE STATION DEVICE, RADIO COMMUNICATION DEVICE, AND RADIO COMMUNICATION SYSTEM

CROSS-REFERENCE TO RELATED APPLICATIONS

The present application is a national stage application, pursuant to 35 U.S.C. § 371, of International Application No. PCT/JP2022/042676, filed Nov. 17, 2022, which claims priority to Japanese Patent Application No. 2021-192469, filed Nov. 26, 2021, the entire contents of each are incorporated herein by reference.

TECHNICAL FIELD

The present disclosure relates to a base station device, a radio communication device, and a radio communication system.

BACKGROUND ART

Radio access methods and radio networks for cellular mobile communication (hereinafter, also referred to as "Long Term Evolution (LTE)", "LTE-Advanced (LTE-A)", "LTE-Advanced Pro (LTE-A Pro)", "New Radio (NR)", "New Radio Access Technology (NRAT)", "Evolved Universal Terrestrial Radio Access (EUTRA)", or "Further EUTRA (FEUTRA)") are considered in the 3rd Generation Partnership Project (3GPP). Note that, in the following description, LTE includes LTE-A, LTE-A Pro, and EUTRA, and NR includes NRAT and FEUTRA. In LTE, a base station device (base station) is also referred to as an evolved NodeB (eNodeB). In NR, a base station device is also referred to as a gNodeB. In addition, in NR, a terminal device (mobile station, mobile station device, and terminal) is also referred to as user equipment (UE). LTE and NR are cellular communication systems in which a plurality of areas covered by a base station device is arranged in a cell form. A single base station device may manage a plurality of cells.

NR is a radio access technology (RAT) different from LTE as a next-generation radio access method for LTE. NR is an access technology that can cope with various use cases including enhanced mobile broadband (eMBB), massive machine type communications (mMTC), and ultra-reliable and low-latency communications (URLLC). NR is studied aiming at a technical framework corresponding to use scenarios, request conditions, arrangement scenarios, and the like in those use cases.

In recent years, support for high-frequency bands such as millimeter waves and terahertz waves and cost reduction of base stations have been required, and a reduction in the Peak-To-Average-Power-Ratio (PAPR) in the downlink is required. In addition, small satellites (for example, they may be referred to as Cube-sats, micro-satellites, and the like) that are considered as mobile satellites are inferior to conventional satellites in terms of power or antenna gain. Thus, there is a problem in that it is difficult to meet the requirement of low PAPR because they do not have high-performance power amplifiers. Disclosure regarding communication waveforms in uplink is described in PTL 1, disclosure regarding communication waveforms in downlink is described in PTL 2, and disclosure regarding satellites is described in NPL 1.

CITATION LIST

Patent Literature

[PTL 1]
JP 2018-74488 A
[PTL 2]
WO 2021/106837

Non Patent Literature

[NPL 1]
R1-2009098, Gatehouse, Sateliot, "Discussion on scenarios applicable to NB-IoT NTN", 3GPP TSG RAN WG1 #103-e

SUMMARY

Technical Problem

The present disclosure proposes a base station device, a terminal device, and a radio communication system that make it possible to meet the requirement of low PAPR in downlink communication.

Solution to Problem

A base station device of the present disclosure includes a controller configured to: notify a terminal device of first information regarding a signal waveform to be used in downlink communication in an initial connection procedure performed with the terminal device among a first signal waveform and a second signal waveform; and perform the downlink communication with the signal waveform to be used based on the first information.

BRIEF DESCRIPTION OF DRAWINGS

FIG. 18 is a sequence diagram showing an example of the NR 2-step RACH procedure.

DESCRIPTION OF EMBODIMENTS

Figure 1:
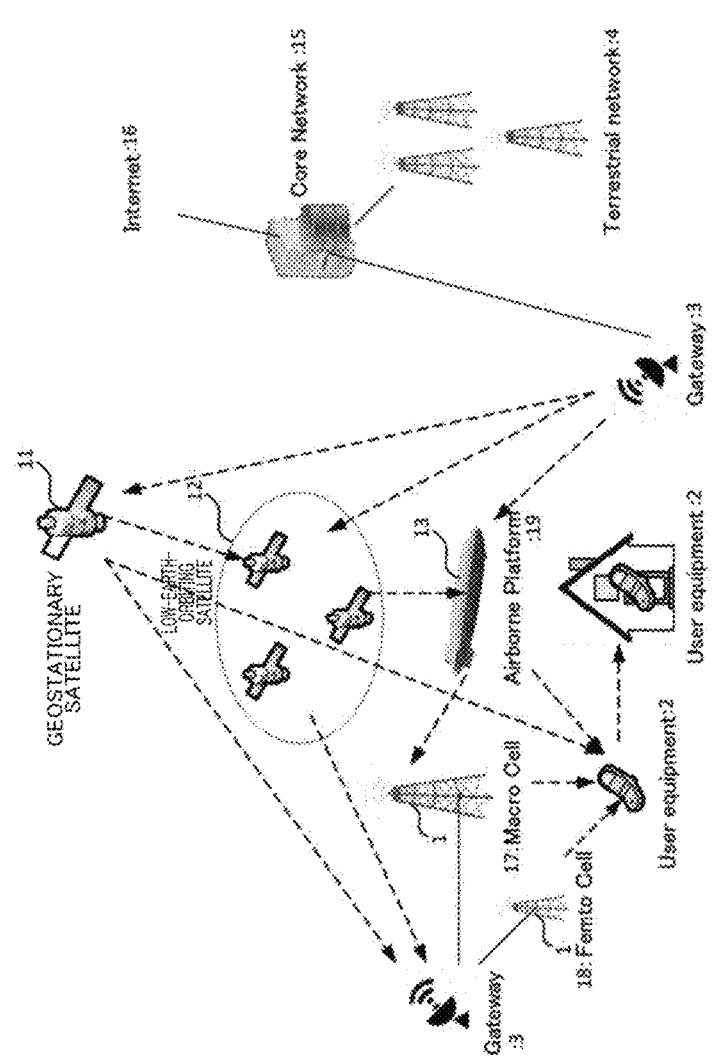
FIG. 1 is a diagram showing an example of an outline of a terrestrial network and a non-terrestrial network.

Hereinafter, embodiments of the present disclosure will be described with reference to the drawings. In one or more embodiments shown in the present disclosure, the elements included in each embodiment can be combined with each other, and the combined result is also part of the embodiments shown in the present disclosure.

As described in Background Art, a reduction in the Peak-To-Average-Power Ratio (PAPR) in the downlink is required. A transmission method using a single-carrier signal (single-carrier transmission method) is effective for reducing PAPR. An example of a single-carrier transmission method is DFT-Spread-OFDM. On the other hand, a transmission method using multi-carrier signals (multi-carrier transmission method) is effective in multi-layer transmission (MIMO transmission). OFDM is an example of a multi-carrier transmission method. It is necessary to support two transmission methods or signal waveforms in the downlink: multi-carrier transmission and single-carrier transmission.

For example, when supporting both multi-carrier transmission and single-carrier transmission, during the initial connection procedure (also referred to as initial access procedure) that a terminal device performs with a base station device, there is an issue of which transmission method to apply, multi-carrier transmission or single-carrier transmission.

As a related technique, there is a method in which a single-carrier signal is used in a high-frequency band such as millimeter waves or terahertz waves, and a multi-carrier signal is used in a low-frequency band. One of the reasons why this method is not suitable for multi-layer transmission is that a reduction in PAPR in higher frequency bands is more required than in lower frequency bands, and that radio waves travel in a straight line in high-frequency bands and thus the number of radio wave propagation paths in high-frequency bands is smaller than in low-frequency bands.

However, even in low-frequency bands, PAPR reduction is required depending on the performance of a base station device. Even in high-frequency bands, there are cases where it is desired to perform multi-layer transmission by artificially increasing the number of radio wave propagation paths. Therefore, the present embodiment proposes a method that enables both of these cases to be handled by properly using both single-carrier signals that can reduce PAPR and multi-carrier signals that are suitable for multi-layer transmission regardless of the frequency band.

Furthermore, as a related technique, single-carrier transmission is performed in the uplink, and in this case, it is necessary to allocate contiguous resources in the frequency domain. The reason for this is that PAPR increases unless resources are allocated contiguously in the frequency domain. In this case, if the communication quality of consecutive resources is poor, high-speed communication cannot be achieved. Even when single-carrier transmission is performed on the downlink, a similar problem may occur if there is a constraint on allocating consecutive resources to terminal devices. The present embodiment proposes a method that enables discontiguous resource allocation in the frequency domain while suppressing an increase in PAPR. More flexible resource allocation becomes possible, and the speed and capacity of downlink communication can be further increased.

Below, first, prior knowledge regarding the embodiments of the present disclosure will be described.

\<Terrestrial Network and Non-Terrestrial Network\>

FIG. 1 shows an example of an outline of a terrestrial network and a non-terrestrial network.

In cellular mobile communications, a cell (macro cell 17, micro cell, femto cell 18, or small cell) is made up of a base station device 1 (for example, eNodeB (eNB), gNodeB (gNB), RAN node (including EUTRAN, NGRAN)) or a relay device 3 installed on the ground, and a radio network is made up of a plurality of cells. The base station device 1 or the relay device 3 may be referred to as a ground station device. A radio network composed of and provided by ground station devices is referred to as a terrestrial network 4.

On the other hand, due to demands such as reducing the cost of base station devices and providing coverage to areas where radio waves are difficult to reach from base station devices, provision of a radio network configured by communication devices floating in the air, such as, satellites orbiting the earth (satellite base station devices, satellite relay station devices, space stations), aerial vehicles, and drones, is being considered. A radio network composed of communication devices other than ground stations is referred to as a non-terrestrial network (NTN).

Examples of communication devices other than ground stations include satellite devices and aviation station devices. A satellite device is a device such as an artificial satellite that floats outside the atmosphere and has a radio communication function. The satellite devices in the present embodiment include a low earth orbiting (LEO) satellite 12, a medium earth orbiting (MEO) satellite, a geostationary earth orbiting (GEO) satellite 11, and a highly elliptical orbiting (HEO) satellites. The aviation station device 13 is a device such as an aircraft or a balloon that floats in the atmosphere and has a radio communication function. The aviation station device 13 in the present embodiment includes an airborne platform 19, specifically, for example, an unmanned aircraft system (UAS), a tethered unmanned aircraft system (UAS), a light unmanned aircraft system (Lighter than Air UAS, LTA), a heavy unmanned aircraft system (Heavier than Air UAS, HTA), and a high altitude unmanned aircraft system (High Altitude UAS Platform, HAP). Note that communication devices other than ground stations may also be referred to as "eNodeB (eNB), gNodeB (gNB), RAN node (including EUTRAN, NGRAN)" from the perspective of cellular mobile communications based on 3GPP.

The satellite devices 11 and 12 and the aviation station device 13 are connected to a terrestrial network (core network, for example, EPC or 5GC) via the relay station 3 installed on the earth. The core network 15 is connected to a wide area network such as the Internet 16. Hereinafter, the relay station 3 may be referred to as an earth station (very small aperture terminal, gateway, control earth station, HUB station). A terminal device 2 (UE: User Equipment) corresponding to a non-terrestrial network communicates with these satellite devices 11 and 12 and/or the aviation station device 13. Terminal devices (terrestrial terminal devices) compatible with non-terrestrial networks include mobile phones, smartphones, cars, buses, trains, aircrafts, M2M (Machine to Machine)/IoT (Internet of Things) devices, relay stations for relaying satellite communications, and base stations for receiving satellite communications.

<Satellite Communication>

Satellite communication refers to radio communication between a satellite device and a terminal device. Satellite device is mainly divided into geostationary satellites and low-earth-orbiting satellites.

Figure 2:
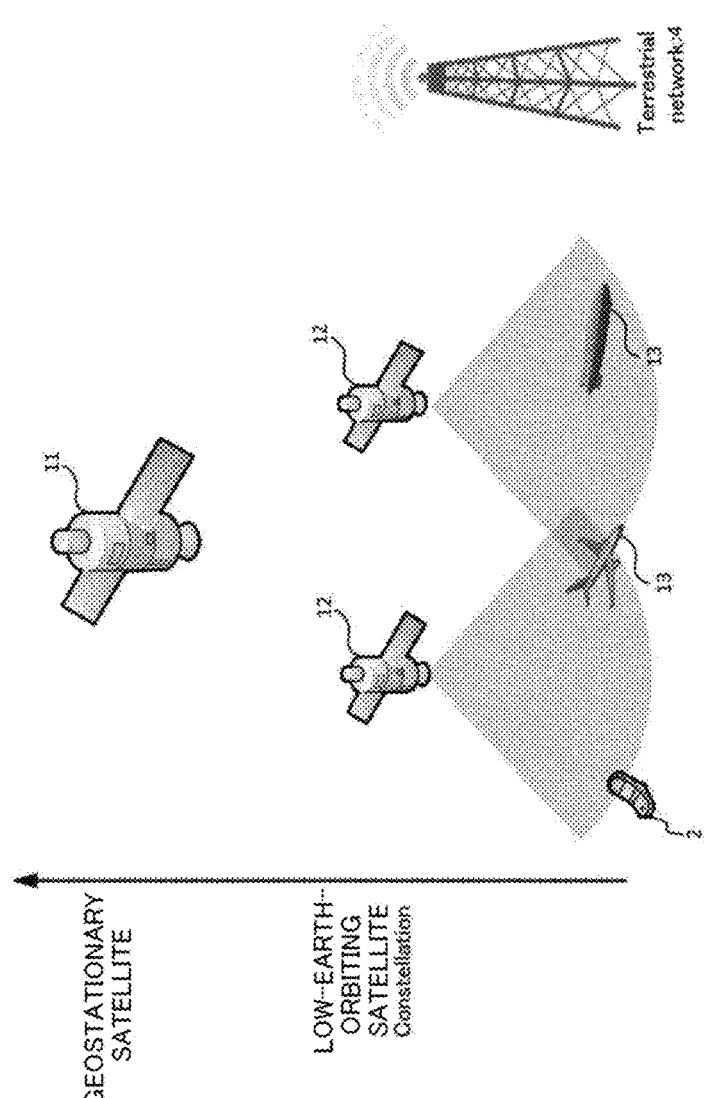
FIG. 2 is a diagram showing an example of an outline of a geostationary satellite and a low-earth-orbiting satellite.

FIG. 2 shows an example of an outline of the geostationary satellite 11 and the low-earth-orbiting satellite 12. The geostationary satellite 11 is located at an altitude of approximately 35,786 km and revolves around the earth at the same speed as the earth's rotation speed. The geostationary satellite 11 is a satellite whose relative speed with respect to the terminal device 2 on the ground is approximately 0, and is observed from the terminal device 2 on the ground as if it were stationary. The low-earth-orbiting satellite 12 is generally located at an altitude of 100 km and 2000 km, and is a satellite that orbits at a lower altitude than other satellites. Unlike the geostationary satellite 11, the low-earth-orbiting satellite 12 has a relative speed with respect to the terminal device 2 on the ground, and is observed from the terminal device 2 on the ground as if it were moving.

Figure 3:
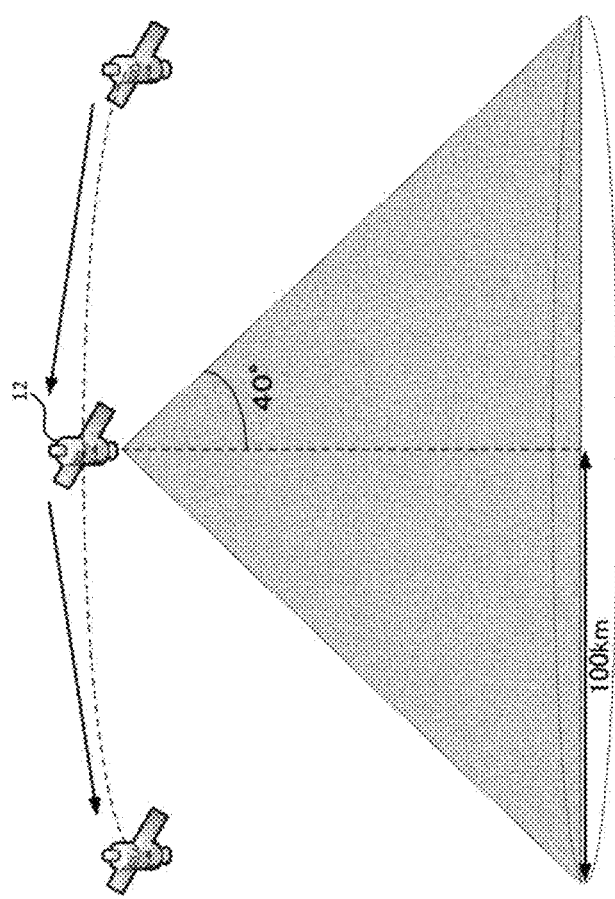
FIG. 3 is a diagram showing an example of a cell configured by a low-earth-orbiting satellite.

FIG. 3 is an example of a cell configured by the low-earth-orbiting satellite 12. A satellite orbiting in a low orbit communicates with a terminal device on the ground while having a predetermined directivity on the ground. The low-earth-orbiting satellite 12 is moving at a constant speed. When it becomes difficult for a certain low-earth-orbiting satellite 12 to provide satellite communication to a terminal device on the ground, a subsequent low-earth-orbiting satellite (neighbor satellite station) provides satellite communication to the terminal device on the ground (that is, it is assumed that there is connected mobility).

As mentioned above, medium-earth-orbiting satellites and low-earth-orbiting satellites 12 move in orbit at very high speeds in the sky. For example, in the case of low-earth-orbiting satellites at an altitude of 600 km, they move in orbit at a speed of 7.6 km/s. The low-earth-orbiting satellite 12 forms a cell (or beam) on the ground with a radius of several tens of kilometers to several hundred kilometers. However, since the cells formed on the ground also move with the movement of a satellite, the terminal device on the ground may need to perform handover even if the terminal device is not moving. For example, assuming a case where the cell diameter formed on the ground is 50 km and the ground terminal device is not moving, handover occurs in about 6 to 7 seconds. Note that the numerical values shown in the figures are just examples, and the present invention is not limited to these numerical values.

Non-terrestrial networks are expected to provide the following services:

Extension of services to terminal devices (mainly IoT devices/MTC, public safety/critical communications) in areas that cannot be covered by terrestrial networks (for example, outside of cell coverage)

Service reliability and resiliency to reduce service vulnerability to physical attacks or natural disasters Connection and provision of services to airplane passengers and aircraft terminals such as drones (for example, Aerial UE(s))

Connection and provision of services to mobile terminals such as ships and trains Provision of highly efficient multicast/broadcast services such as A/V content, group communications, IoT broadcast services, software downloads, and emergency messages Traffic offloading of communications between terrestrial and non-terrestrial networks In addition to terrestrial base station devices, the base station device in the following description may include non-terrestrial base station devices that operate as communication devices, such as satellites, drones, balloons, and airplanes.

In the following description, when a specific example is shown, if there is a place where a specific value is shown and explained, the value is not limited to that example, and another value may be used.

The resources described in the following description include at least one of frequency, time, resource element (including REG, CCE, CORESET), resource block, bandwidth part (BWP), component carrier, symbol, sub-symbol, slot, mini-slot, subslot, subframe, frame, PRACH occasion, occasion, code, multi-access physical resource, multi-access signature, subcarrier spacing (Numerology), and the like.

<Outline of Communication System>

Figure 4:
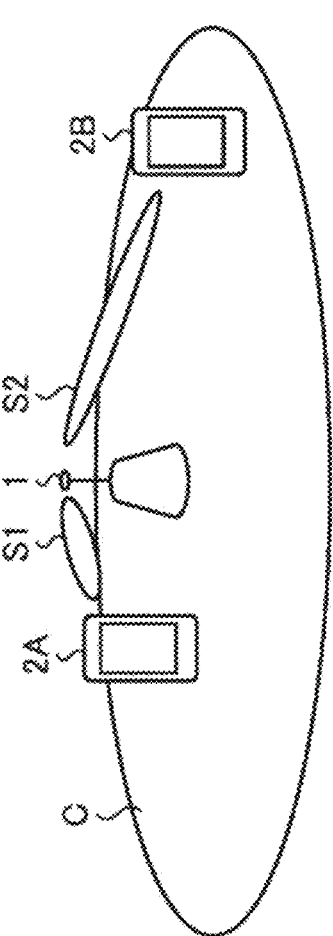
FIG. 4 is a diagram for explaining an outline of a communication system according to an embodiment of the present disclosure.

FIG. 4 is a diagram for explaining an outline of a communication system according to an embodiment of the present disclosure. The communication system in FIG. 4 includes a base station device 1 and a plurality of terminal devices 2A and 2B. Hereinafter, when the terminal devices 2A and 2B are not particularly distinguished, they will be referred to as the terminal device 2, and the terminal device 2 may be either the terminal device 2A or 2B.

The base station device 1 determines a signal waveform used for downlink communication with the terminal device 2 (for example, a signal waveform to be used in the initial connection with the terminal device 2). For example, the base station device 1 determines to use either a single-carrier signal or a multi-carrier signal for downlink communication. Examples of multi-carrier signals include OFDM signals and CP-OFDM signals. Examples of single-carrier signals include a DFT-S-OFDM signal (SC-FDMA signal), an SC-QAM signal, and a single-carrier with zero padding/unique word. Details of these signals will be described later.

The base station device 1 determines a signal waveform to be used for each terminal device 2, for example, and notifies the terminal device 2 of information regarding the determined signal waveform. The base station device 1 performs downlink communication with the terminal device 2 using the notified signal waveform. As an example, the base station device 1 determines a single-carrier signal for downlink communication where low PAPR is strictly required, and determines a signal waveform other than the single-carrier signal (here, the multi-carrier signal) for downlink communication where low PAPR is not so strictly required. Accordingly, the base station device 1 can achieve low PAPR and improve the efficiency of the entire system.

In the example of FIG. 4, the base station device 1 selects a multi-carrier signal and performs downlink communication S1 with respect to the terminal device 2A located closer to the center of the cell C. This is because the required transmission power for the terminal device 2A located closer to the center of the cell C is smaller than that for the cell edge, making it easier to secure the necessary transmission power even if the PAPR is high. Furthermore, the base station device 1 selects a single-carrier signal and performs downlink communication S2 with respect to the terminal device 2B located closer to the edge of the cell C. This is because larger transmission power is required and low PAPR is required in order to perform downlink communication with the terminal device 2B located closer to the cell edge.

Although an example has been described in which the base station device 1 determines the signal waveform according to the position of the terminal device 2 in the cell C, the method by which the base station device 1 determines the signal waveform is not limited to this. Details of how the base station device 1 determines the signal waveform will be described later.

<Configuration Example of Base Station Device>

Figure 5:
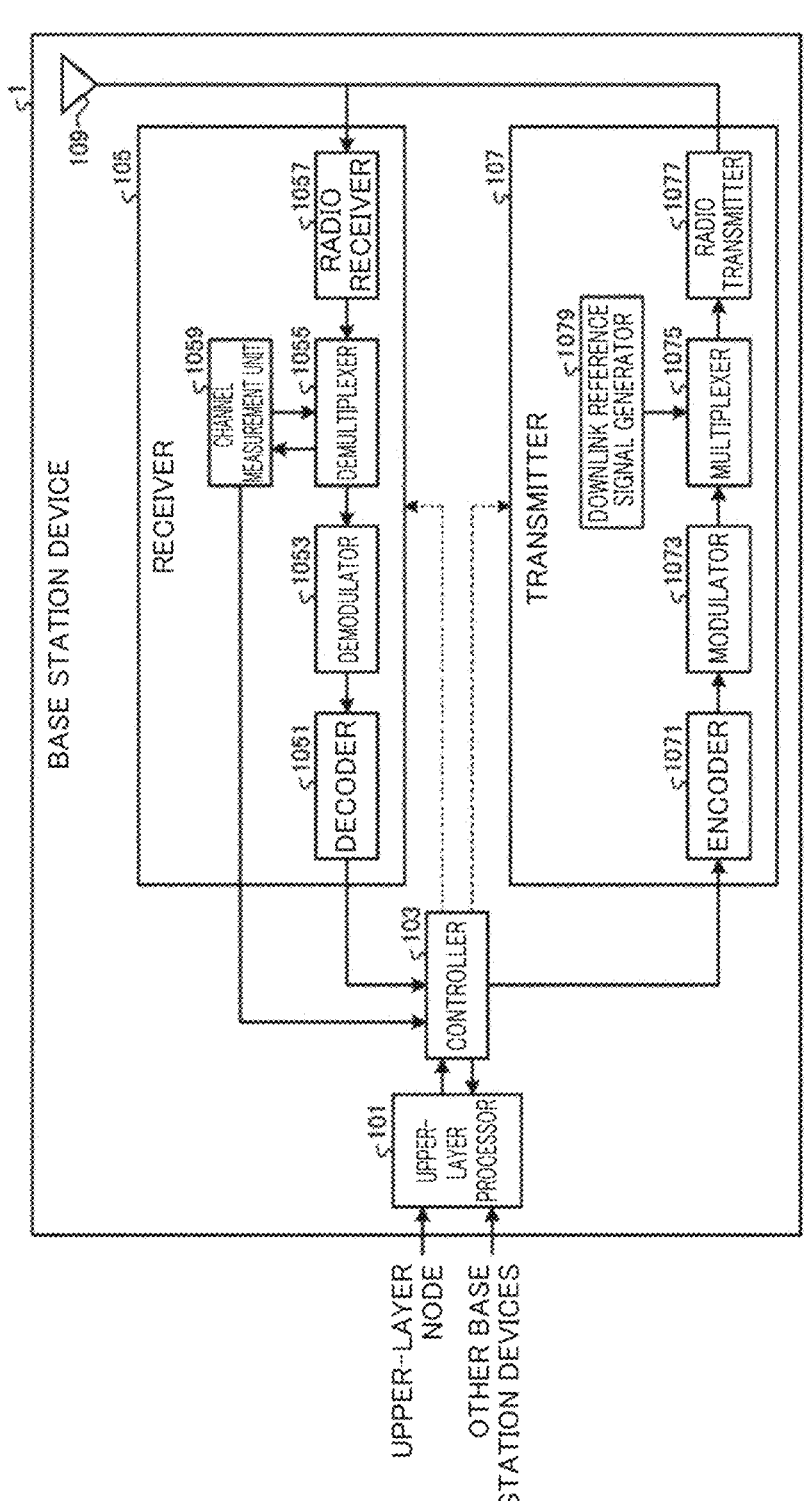
FIG. 5 is a block diagram of a base station device according to an embodiment of the present disclosure.

FIG. 5 is a block diagram of the base station device 1 according to the embodiment of the present disclosure. The base station device 1 includes an upper-layer processor 101, a controller 103, a receiver 105, a transmitter 107, and an antenna 109. The controller 103 is a first controller that performs control on the base station device 1 side.

The base station device 1 may support one or more RATs (Radio Access Technologies). For example, base station device 1 may support both LTE and NR. In this case, some or all of the units included in the base station device 1 may be configured individually depending on the RAT. For example, the receiver 105 and the transmitter 107 are configured individually for LTE and NR. In addition, in the NR cell, some or all of the units included in the base station device 1 may be individually configured according to a parameter set regarding a transmission signal. For example, in a certain NR cell, a radio receiver 1057 and a radio transmitter 1077 may be individually configured according to a parameter set regarding a transmission signal.

The upper-layer processor 101 outputs downlink data (transport block) to the controller 103. The upper-layer processor 101 performs processing of a medium access control (MAC) layer, a packet data convergence protocol (PDCP) layer, a radio link control (RLC) layer, a radio resource control (RRC) layer. In addition, the upper-layer processor 101 generates control information for controlling the receiver 105 and the transmitter 107, and outputs the generated control information to the controller 103.

The upper-layer processor 101 performs processing and management regarding RAT control, radio resource control, subframe structure, scheduling control, and/or CSI reporting control. Processing and management in the upper-layer processor 101 are performed for each terminal device or in common for all terminal devices connected to the base station device. Processing and management in the upper-layer processor 101 may be performed individually depending on the RAT. For example, the upper-layer processor 101 individually performs processing and management in LTE and processing and management in NR.

In the RAT control in the upper-layer processor 101, management regarding the RAT is performed. For example, in RAT control, management regarding LTE and/or management regarding NR is performed. Management regarding NR includes the setting and processing of parameter sets regarding transmission signals in NR cells.

In the radio resource control in the upper-layer processor 101, configuration information in the subject device is managed. Radio resource control in the upper-layer processor 101 involves the generation and/or management of downlink data (transport blocks), system information, RRC messages (RRC parameters), and/or MAC control elements (CE).

Subframe settings in the upper-layer processor 101 involve the management of subframe settings, subframe pattern settings, uplink downlink settings, uplink reference UL-DL settings, and/or downlink reference UL-DL settings. Note that the subframe settings in the upper-layer processor 101 are also referred to as base station subframe settings. Furthermore, the subframe settings in the upper-layer processor 101 can be determined based on the uplink traffic amount and the downlink traffic amount. Furthermore, subframe settings in the upper-layer processor 101 can be determined based on the scheduling result of the scheduling control in the upper-layer processor 101.

In the scheduling control in upper-layer processor 101, the frequency and subframe to which a physical channel is allocated and physical channel coding rate, modulation method, transmission power, and the like are determined based on the channel state information received from the terminal device and the propagation path estimation value or channel quality input from a channel measurement unit 1059. For example, the controller 103 generates control information (DCI format) based on the scheduling result of the scheduling control in the upper-layer processor 101.

In the CSI reporting control in the upper-layer processor 101, CSI reporting of the terminal device 2 is controlled. For example, settings regarding CSI reference resources assumed for calculating CSI in the terminal device 2 are controlled.

The controller 103 controls the receiver 105 and the transmitter 107 based on the control information from the upper-layer processor 101. The controller 103 generates control information for the upper-layer processor 101 and outputs it to the upper-layer processor 101. The controller 103 receives the decoded signal from a decoder 1051 and the channel estimation result from the channel measurement unit 1059. The controller 103 outputs a signal to be encoded to an encoder 1071. The controller 103 is used to control all or part of the base station device 1.

The controller 103 determines a signal waveform (hereinafter also referred to as a signal waveform to be used) to be used for downlink communication with the terminal device 2 from among the single-carrier signal and the multi-carrier signal. The controller 103 controls the transmitter 107 to notify the terminal device 2 of information regarding the signal waveform to be used using a predetermined signal waveform (for example, a single-carrier signal). In addition, the controller 103 controls the transmitter 107 to perform downlink communication with the terminal device 2 using the notified signal waveform to be used.

The receiver 105 receives the signal transmitted from the terminal device 2 via the antenna 109 under the control of the controller 103, performs reception processing such as separation, demodulation, and decoding, and outputs the received information to the controller 103. Note that the reception processing in the receiver 105 is performed based on predefined settings or settings notified to the terminal device 2 by the base station device 1. The receiver 105 includes a decoder 1051, a demodulator 1053, a demultiplexer 1055, a radio receiver 1057, and a channel measurement unit 1059.

The radio receiver 1057 performs, on the uplink signal received via the antenna 109, conversion to an intermediate frequency (downconversion), removal of unnecessary frequency components, control of amplification level to maintain an appropriate signal level, orthogonal demodulation based on the in-phase and orthogonal components of the received signal, analog-to-digital conversion of signals, removal of guard interval (GI), and/or extraction of frequency domain signals by fast Fourier transform (FFT).

The demultiplexer 1055 separates an uplink channel such as PUCCH or PUSCH and/or an uplink reference signal from the signal input from the radio receiver 1057. The demultiplexer 1055 outputs the uplink reference signal to the channel measurement unit 1059. The demultiplexer 1055 performs propagation path compensation for the uplink channel based on the propagation path estimation value input from the channel measurement unit 1059.

The demodulator 1053 performs BPSK (Binary Phase Shift Keying), $\pi/2$ BPSK, QPSK (Quadrature Phase Shift Keying), 16QAM (Quadrature Amplitude Modulation), 64QAM, 256QAM, and the like to demodulate the received signal. Furthermore, the demodulator 1053 performs separation and demodulation of MIMO-multiplexed uplink channels.

The decoder 1051 performs decoding processing on the encoded bits of the demodulated uplink channel. The decoded uplink data and/or uplink control information is output to the controller 103. The decoder 1051 performs decoding processing for each transport block for PUSCH.

The channel measurement unit 1059 measures the propagation path estimation value and/or channel quality from the uplink reference signal input from the demultiplexer 1055 and outputs it to the demultiplexer 1055 and/or the controller 103. For example, the channel measurement unit 1059 measures the propagation path estimation value for performing propagation path compensation for PUCCH or PUSCH using UL-DMRS, and measures the quality of the channel in the uplink using SRS (Sounding Reference Signal).

The transmitter 107 performs transmission processing such as encoding, modulation, and multiplexing on downlink control information and downlink data input from the upper-layer processor 101 under the control of the controller 103. For example, the transmitter 107 generates and multiplexes PHICH, PDCCH, EPDCCH, PDSCH, and downlink reference signals, and generates a transmission signal. Note that the transmission processing in the transmitter 107 is based on predefined settings, settings notified by the base station device 1 to the terminal device 2, or settings notified through the PDCCH or EPDCCH transmitted in the same subframe. The transmitter 107 includes an encoder 1071, a modulator 1073, a multiplexer 1075, a radio transmitter 1077, and a downlink reference signal generator 1079.

The encoder 1071 encodes the HARQ indicator (HARQ-ACK), downlink control information, and downlink data input from the controller 103 using an encoding method such as block encoding, convolutional encoding, or turbo encoding. The modulator 1073 modulates the encoded bits input from the encoder 1071 using a modulation method such as BPSK, $\pi/2$ BPSK, QPSK, 16QAM, 64QAM, or 256QAM. The downlink reference signal generator 1079 generates a downlink reference signal based on a physical cell identification (PCI), RRC parameters set in the terminal device 2, and the like.

The multiplexer 1075 multiplexes the modulation symbol of each channel and the downlink reference signal, and arranges it in a predetermined resource element.

The radio transmitter 1077 performs processing on the signal from the multiplexer 1075, such as conversion of signals using at least the latter of DFT and IDFT, addition of guard intervals, generation of baseband digital signals, conversion to analog signals, orthogonal modulation, conversion (upconversion) from an intermediate frequency signal to a high-frequency signal, removal of extra frequency components, and amplification of power and generates a transmission signal. The transmission signal output by the radio transmitter 1077 is transmitted from the antenna 109.

The radio transmitter 1077 can support a plurality of signal waveforms (downlink signal waveforms) in the downlink. Details of the radio transmitter 1077 in the base station device 1 that supports both the first signal waveform and the second signal waveform will be explained using FIGS. 6 to 8. In the following explanation, it is assumed that the first signal waveform includes a multi-carrier signal and the second signal waveform includes a single-carrier signal. However, a case where the first signal waveform includes a single-carrier signal and the second signal waveform includes a multi-carrier signal is not excluded.

Figure 6:
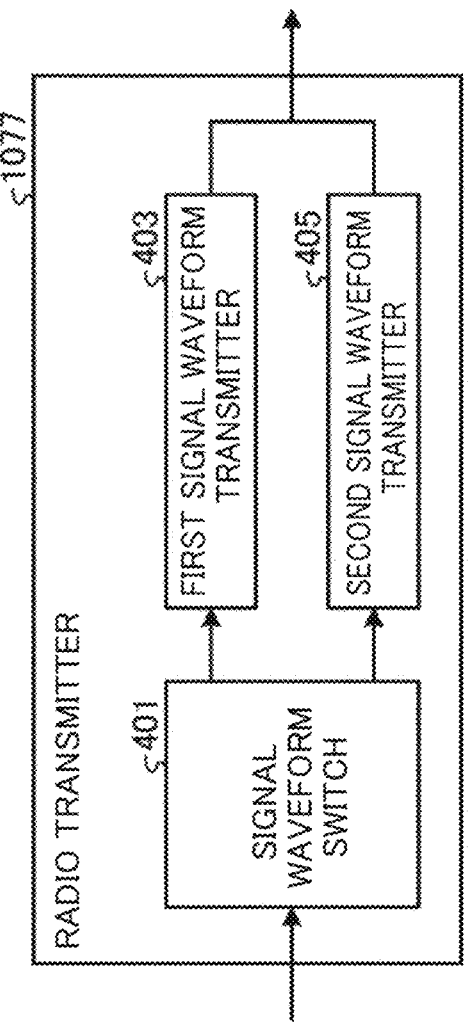
FIG. 6 is a block diagram of a radio transmitter in the base station device.

FIG. 6 is a block diagram of the radio transmitter 1077. The radio transmitter 1077 includes a signal waveform switch 401, a first signal waveform transmitter 403, and a second signal waveform transmitter 405.

The signal waveform switch 401 (signal waveform controller) determines whether to use the first signal waveform or the second signal waveform in downlink communication depending on conditions or situations, and switches the output destination of the signal input from the multiplexer 1075 according to the result of the determination. When using the first signal waveform, the first signal waveform transmitter 403 is the output destination, and downlink transmission processing is performed by the first signal waveform transmitter 403. When using the second signal waveform, the second signal waveform transmitter 405 is the output destination, and downlink transmission processing is performed by the second signal waveform transmitter 405. Conditions or situations for switching in the signal waveform switch 401 will be described later. In FIG. 6, the first signal waveform transmitter 403 and the second signal waveform transmitter 405 are described as different processors, but they may be treated as one processor and the transmission processing may be switched.

Figure 7:
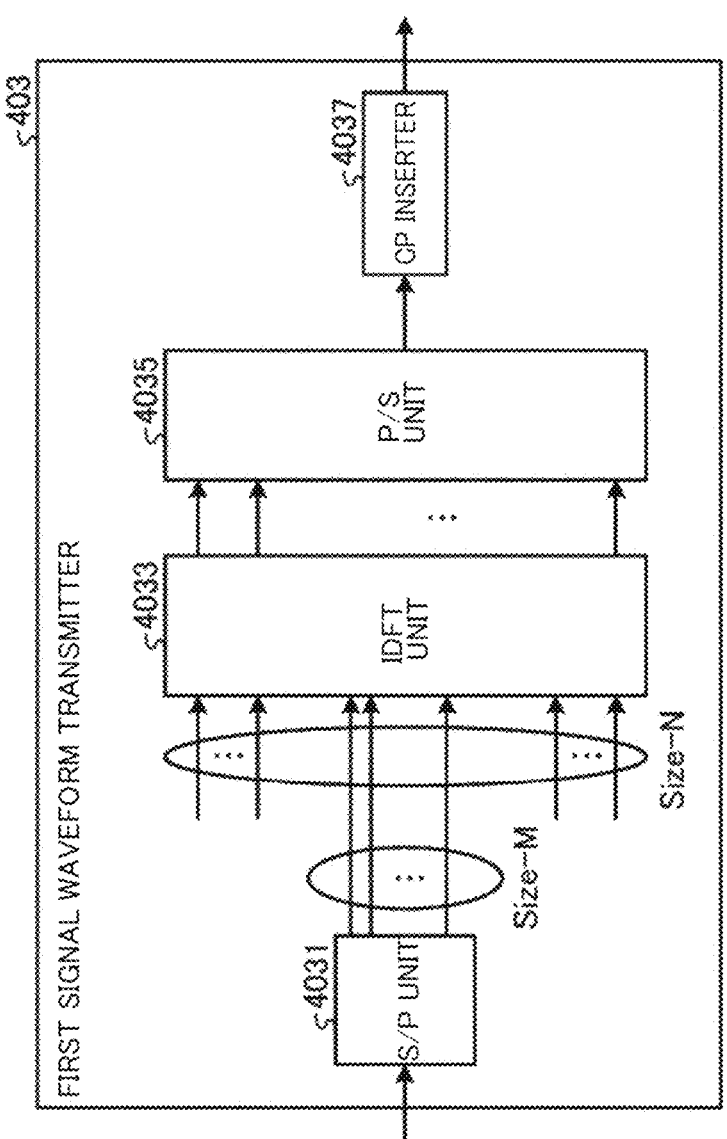
FIG. 7 is a block diagram of a first signal waveform transmitter in the base station device.

FIG. 7 is a block diagram of the first signal waveform transmitter 403. The first signal waveform transmitter 403 performs transmission processing on a multi-carrier signal (here, a downlink channel and signal transmitted by CP-OFDM) as a signal waveform of downlink communication. The first signal waveform transmitter 403 includes an S/P (Serial/Parallel) unit 4031, an IDFT (Inverse Discrete Fourier Transform) unit 4033, a P/S (Parallel/Serial) unit 4035, and a CP inserter 4037.

The S/P unit 4031 converts the input serial signal into a parallel signal of size M. The size M is determined depending on the size of frequency domain resources used for downlink communication. The parallel signal of size M is input to the IDFT unit 4033 so as to correspond to a predetermined frequency domain.

The IDFT unit 4033 performs inverse Fourier transform processing on the parallel signal of size N. When the size N is an exponent of 2, the Fourier transform processing may be IFFT (Inverse Fast Fourier Transform) processing. The P/S unit 4035 converts a parallel signal of size N into a serial signal. The CP inserter 4037 inserts a CP for each OFDM symbol.

Figure 8:
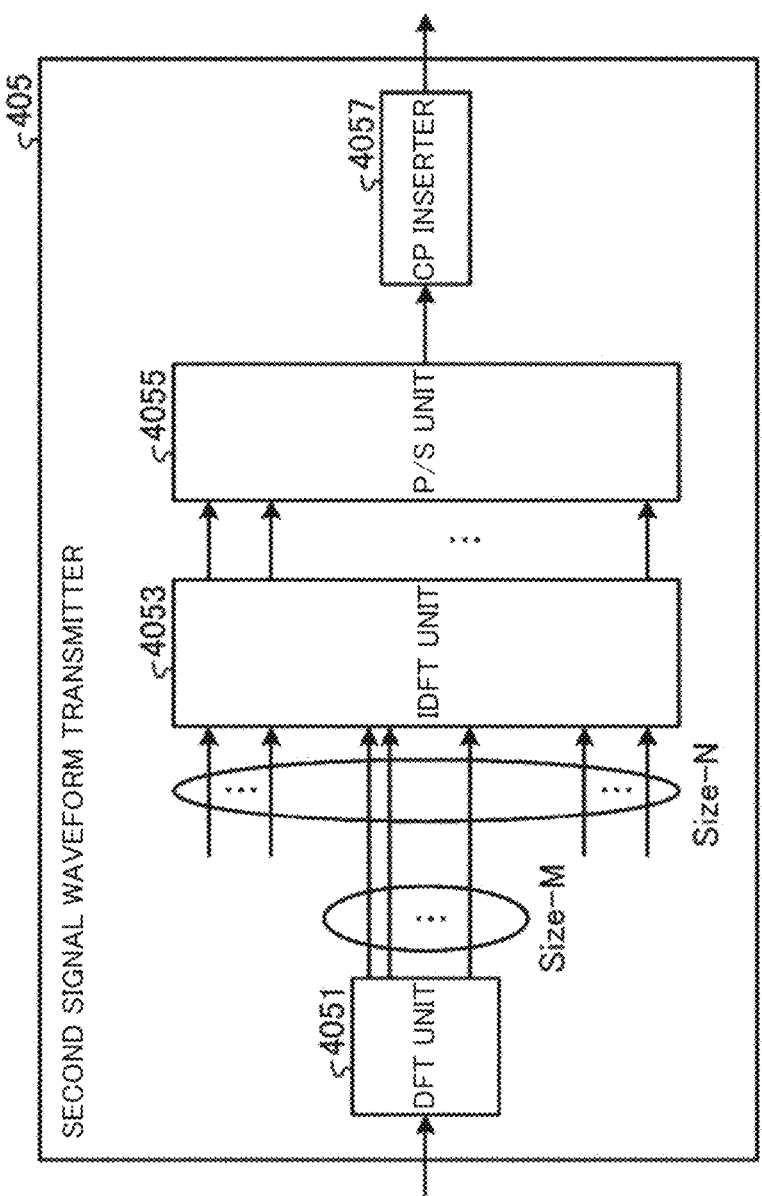
FIG. 8 is a block diagram of a second signal waveform transmitter in the base station device.

FIG. 8 is a block diagram of the second signal waveform transmitter 405. The second signal waveform transmitter 405 performs transmission processing on a single-carrier signal (here, a downlink channel and signal transmitted by SC-FDMA) as a signal waveform of downlink communication. The second signal waveform transmitter 405 uses DFT-Spread-OFDM for transmission processing. The second signal waveform transmitter 405 includes a DFT unit 4051, an IDFT (Inverse Discrete Fourier Transform) unit 4053, a P/S unit 4055, and a CP inserter 4057. The DFT unit 4051 performs inverse Fourier transform (DFT) on the input serial signal into a parallel signal of size M. The size M is determined depending on the size of frequency domain resources used for downlink communication. The parallel signal of size M is input to the IDFT unit 4053 so as to correspond to a predetermined frequency domain. The IDFT unit 4053 performs inverse Fourier transform processing on the parallel signal of size N. When the size N is an exponent of 2, the inverse Fourier transform processing may be IFFT (Inverse Fast Fourier Transform) processing. The P/S unit 4055 converts a parallel signal of size N into a serial signal. The CP inserter 4057 inserts a CP for each SC-FDMA symbol or for each DFT-Spread-OFDM symbol.

Figure 9:
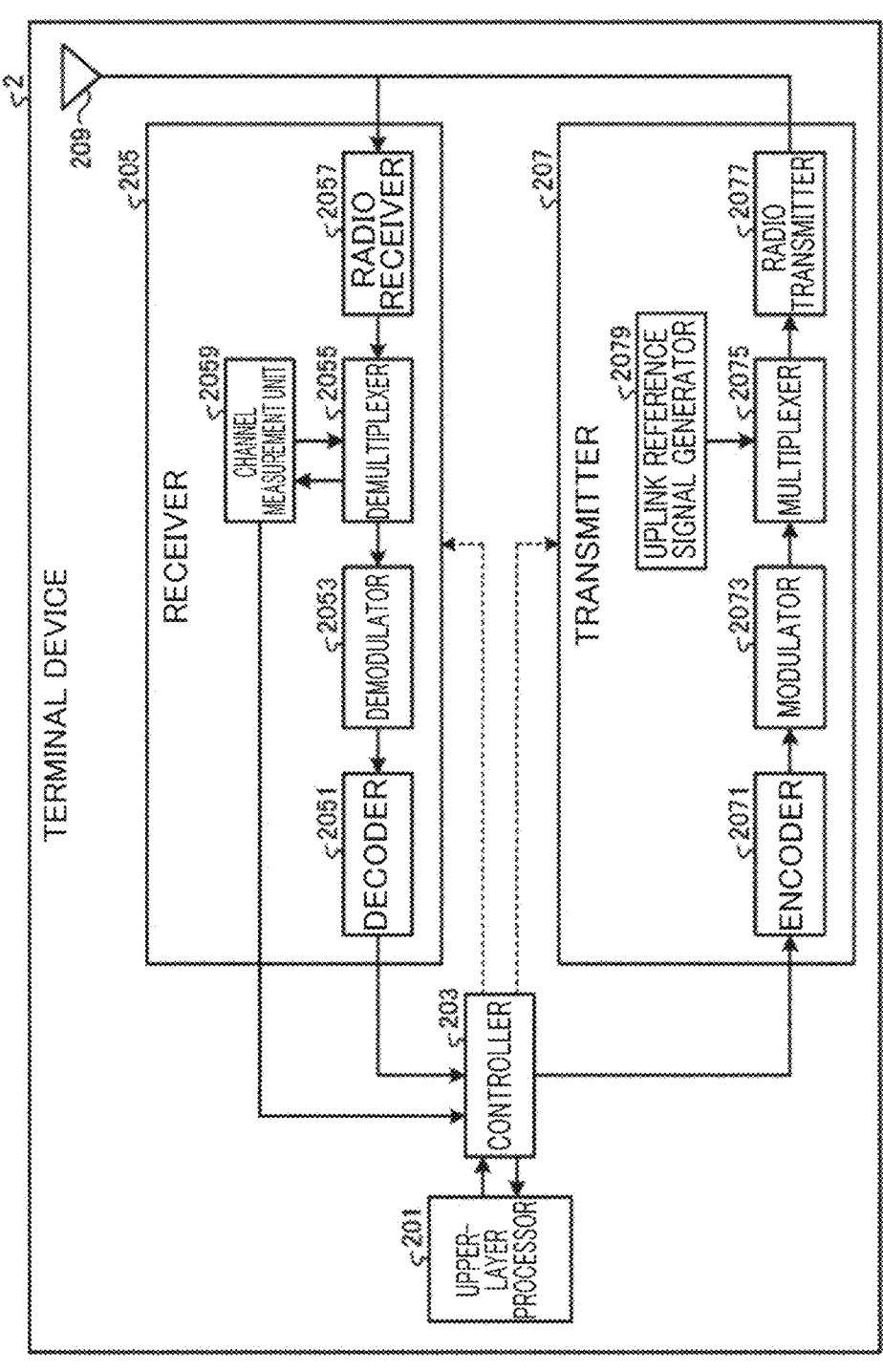
FIG. 9 is a block diagram of a terminal device according to an embodiment of the present disclosure.

FIG. 9 is a block diagram of the terminal device 2 according to the embodiment of the present disclosure. The terminal device 2 in FIG. 9 includes an upper-layer processor 201, a controller 203, a receiver 205, a transmitter 207, and an antenna 209. The controller 203 is a second controller that performs control on the terminal device 2 side.

The terminal device 2 may support one or more RATs (Radio Access Technologies). For example, the terminal device 2 may support both LTE and NR. In this case, some or all of the units included in the terminal device 2 may be configured individually depending on the RAT. For example, the receiver 205 and the transmitter 207 are configured individually for LTE and NR. In addition, in the NR cell, some or all of the units included in the terminal device 2 shown in FIG. 9 may be individually configured according to the parameter set regarding the transmission signal. For example, in a certain NR cell, the radio receiver 2057 and the radio transmitter 2077 may be individually configured according to a parameter set regarding the transmission signal.

The upper-layer processor 201 outputs uplink data (transport block) to the controller 203. The upper-layer processor 201 performs processing of a medium access control (MAC) layer, a packet data convergence protocol (PDCP) layer, a radio link control (RLC) layer, and a radio resource control (RRC) layer. In addition, the upper-layer processor 201 generates control information to control the receiver 205 and the transmitter 207 and outputs it to the controller 203.

The upper-layer processor 201 performs processing and management regarding RAT control, radio resource control, subframe structure, scheduling control, and/or CSI reporting control. Processing and management in the upper-layer processor 201 are performed based on predefined settings and/or settings based on control information set or notified from the base station device 1. For example, the control information from the base station device 1 includes RRC parameters, MAC control elements, or DCI. Furthermore, the processing and management in the upper-layer processor 201 may be performed individually depending on the RAT.

For example, the upper-layer processor 201 separately performs processing and management in LTE and processing and management in NR.

In the RAT control in the upper-layer processor 201, management regarding the RAT is performed. For example, in RAT control, management regarding LTE and/or management regarding NR is performed. Management regarding NR includes the setting and processing of parameter sets regarding transmission signals in NR cells.

In the radio resource control in the upper-layer processor 201, configuration information in the subject device is managed. Radio resource control in the upper-layer processor 201 involves the generation and/or management of uplink data (transport blocks), system information, RRC messages (RRC parameters), and/or MAC control elements (CEs).

The upper-layer processor 201 manages subframe settings in the base station device 1 and/or another base station device different from the base station device 1. The subframe settings include uplink or downlink settings for the subframe, subframe pattern settings, uplink downlink settings, uplink reference UL-DL settings, and/or downlink reference UL-DL settings. The subframe setting in the upper-layer processor 201 is also referred to as terminal device subframe setting.

In the scheduling control in the upper-layer processor 201, control information for controlling the scheduling of the receiver 205 and the transmitter 207 is generated based on DCI (scheduling information) from the base station device 1.

In the CSI reporting control in the upper-layer processor 201, control regarding reporting of CSI to the base station device 1 is performed. For example, in CSI reporting control, settings regarding CSI reference resources assumed for calculating CSI in the channel measurement unit 2059 are controlled. The CSI reporting control involves controlling resources (timings) used to report CSI based on DCI and/or RRC parameters.

The controller 203 controls the receiver 205 and the transmitter 207 based on control information from the upper-layer processor 201. The controller 203 generates control information for the upper-layer processor 201 and outputs it to the upper-layer processor 201. The controller 203 receives the decoded signal from the decoder 2051 and the channel estimation result from the channel measurement unit 2059. The controller 203 outputs a signal to be encoded to the encoder 2071. In addition, the controller 203 may be used to control all or part of the terminal device 2.

The controller 203 acquires information regarding the signal waveform (signal waveform to be used) used for downlink communication with the base station device 1 from the base station device 1 through the receiver 205 among the single-carrier signal and the multi-carrier signal. Information regarding the signal waveform to be used may be transmitted in association with a predetermined signal. The predetermined signal may be transmitted with a predetermined signal waveform among a single-carrier signal and a multi-carrier signal. The controller 203 controls the receiver 205 to perform downlink communication with the base station device 1 using the reception processing for the signal waveform to be used.

The receiver 205 receives the signal transmitted from the base station device 1 via the antenna 209 under the control of the controller 203, further performs reception processing such as separation, demodulation, and decoding, and outputs the received information to the controller 203. Note that the reception processing in the receiver 205 is performed based on predefined settings or notifications or settings from the base station device 1. The receiver 205 includes a decoder 2051, a demodulator 2053, a demultiplexer 2055, a radio receiver 2057, and a channel measurement unit 2059.

The radio receiver 2057 performs processing on the uplink signal received via the antenna 209 such as conversion (downconversion) into an intermediate frequency, removal of unnecessary frequency components, control of an amplification level to maintain an appropriate signal level, orthogonal demodulation based on in-phase and orthogonal components of received signals, conversion from analog signals to digital signals, removal of guard interval (GI), and/or extraction of frequency domain signals by fast Fourier transform (FFT).

The radio receiver 2057 can support a plurality of downlink signal waveforms (first signal waveform and second signal waveform). Details of the radio receiver 2057 in the terminal device 2 that supports both the first signal waveform and the second signal waveform will be described using FIGS. 10 to 12.

Figure 10:
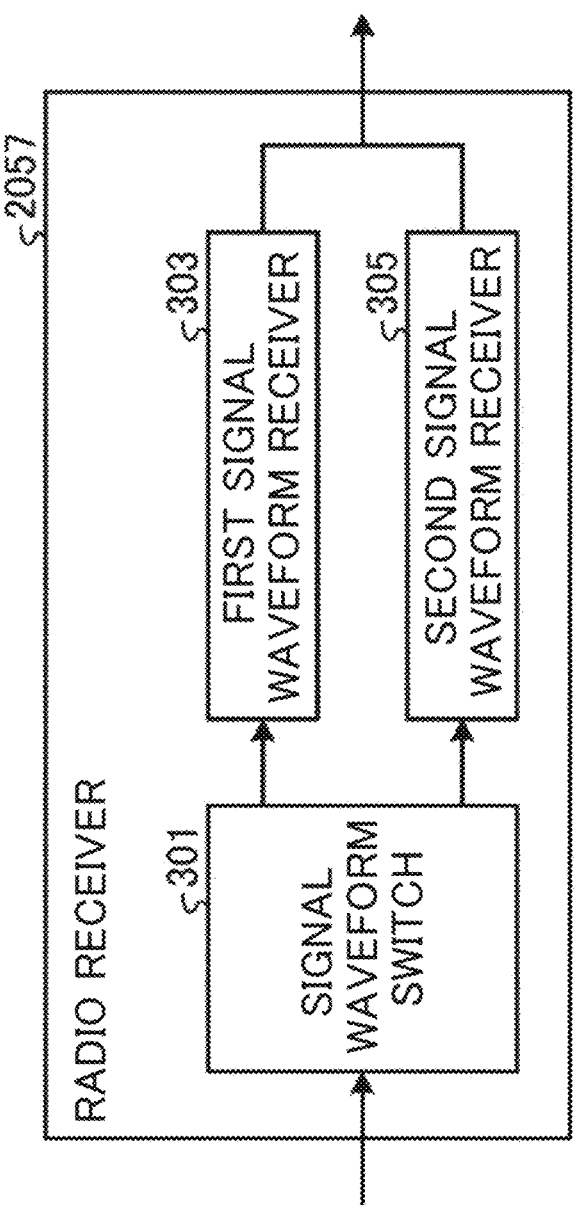
FIG. 10 is a block diagram of a radio receiver in the terminal device.

FIG. 10 is a block diagram of the radio receiver 2057. The radio receiver 2057 includes a signal waveform switch 301, a first signal waveform receiver 303, and a second signal waveform receiver 305.

The signal waveform switch 301 (signal waveform controller) determines whether the received downlink communication signal has a first signal waveform or a second signal waveform depending on the condition or situation, and switches the signal output destination according to the determination result. When the downlink communication signal has the first signal waveform, the downlink communication signal is received by the first signal waveform receiver 303. The reception processing performed by the first signal waveform receiver 303 is reception processing for the first signal waveform. When the downlink communication signal has the second signal waveform, the downlink communication signal is received by the second signal waveform receiver 305. The reception processing performed by the second signal waveform receiver 305 is reception processing for the second signal waveform. Conditions or situations for switching in the signal waveform switch 301 will be described later. In FIG. 10, the first signal waveform receiver 303 and the second signal waveform receiver 305 are described as different processors, but they may be treated as one processor and only a part of the reception processing may be performed by switching.

Figure 11:
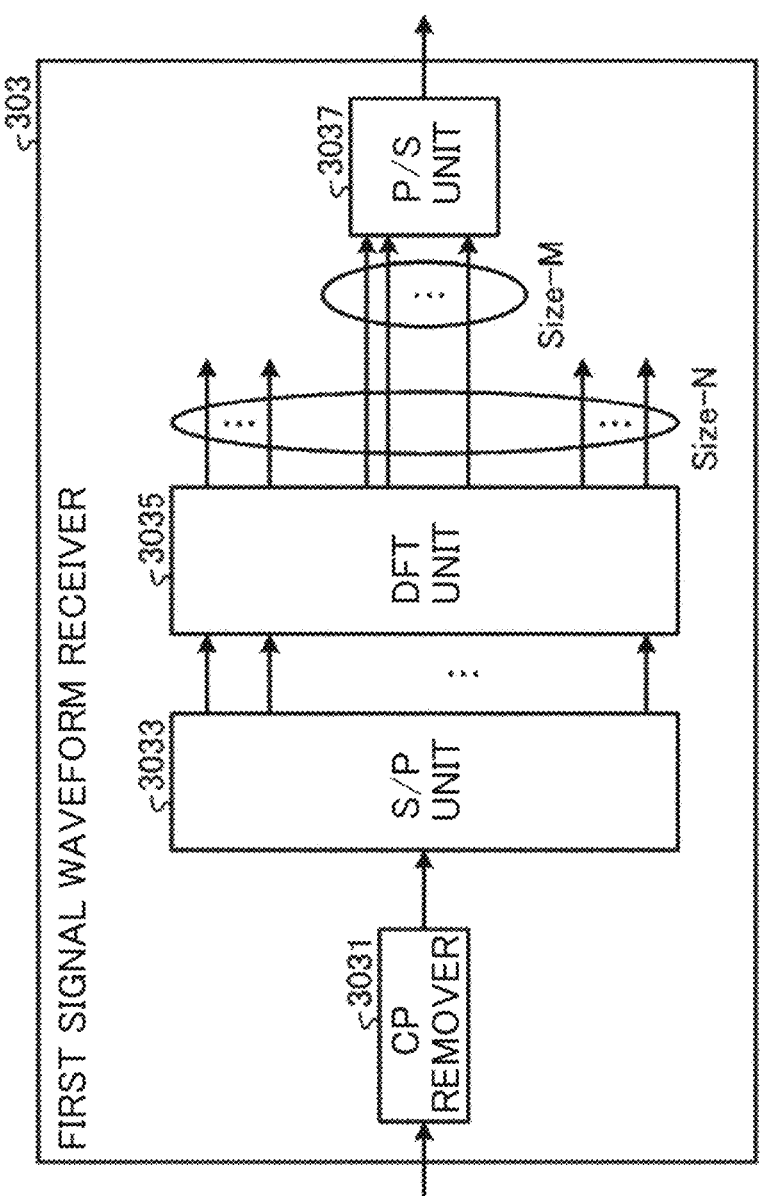
FIG. 11 is a block diagram of a first signal waveform receiver in the terminal device.

FIG. 11 is a block diagram of the first signal waveform receiver 303. The first signal waveform receiver 303 performs reception processing on a multi-carrier signal (here, a downlink channel and signal transmitted by CP-OFDM) as a signal waveform of downlink communication. The first signal waveform receiver 303 includes a CP remover 3031, an S/P unit 3033, a DFT (Discrete Fourier Transform) unit 3035, and a P/S unit 3037.

The CP remover 3031 removes a CP (cyclic prefix) from the received downlink communication signal. The S/P unit 3033 converts the input serial signal into a parallel signal of size N. The DFT unit 3035 performs Fourier transform processing on the parallel signal of size N and outputs a parallel signal of size N. When the size N is an exponent of 2, the Fourier transform processing may be FFT (Fast Fourier Transform) processing. The P/S unit 3037 converts the input parallel signal of size M into a serial signal. The size M is determined depending on the size of frequency domain resources used for downlink communication. A downlink communication signal transmitted by the base station device 1 that performs transmission processing is input to the IDFT 3037.

Figure 12:
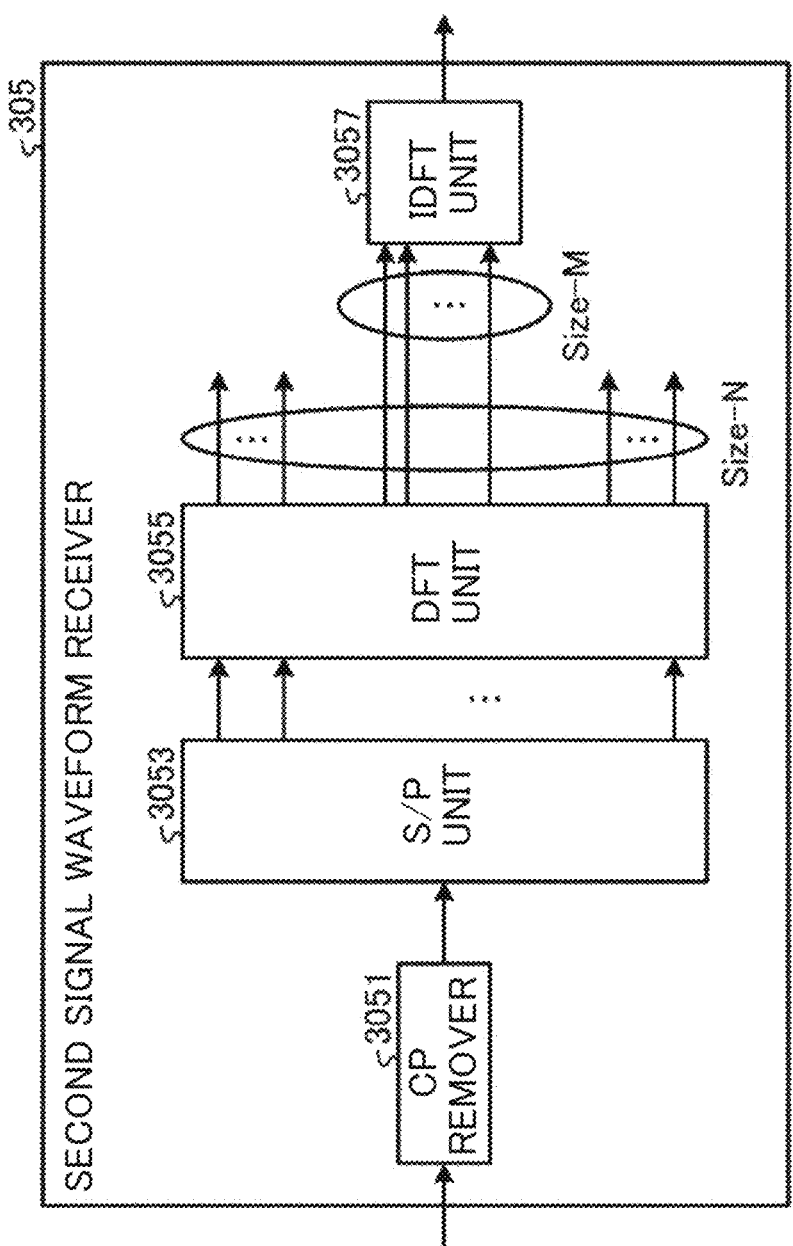
FIG. 12 is a block diagram of a second signal waveform receiver in the terminal device.

FIG. 12 is a block diagram of the second signal waveform receiver 305. The second signal waveform receiver 305 performs reception processing on a single-carrier signal (here, a downlink channel and signal transmitted by SC-FDMA) as a signal waveform of downlink communication. The second signal waveform receiver 305 includes a CP remover 3051, an S/P unit 3053, a DFT (Discrete Fourier Transform) unit 3055, and an IDFT (Inverse Discrete Fourier Transform) unit 3057.

The CP remover 3051 removes a CP (cyclic prefix) from the received downlink communication signal and outputs a serial signal. The S/P unit 3053 converts the input serial signal into a parallel signal of size N. The DFT unit 3055 performs Fourier transform processing on the parallel signal of size N. When the size N is an exponent of 2, the Fourier transform processing may be FFT (Fast Fourier Transform) processing. The IDFT unit 3057 performs inverse Fourier transform processing on the input signal of size M. The size M is determined depending on the size of frequency domain resources used for downlink communication. A downlink communication signal transmitted by the base station device 1 that performs transmission processing is input to the IDFT 3057.

The demultiplexer 2055 in FIG. 9 separates a downlink channel such as PHICH, PDCCH, EPDCCH, or PDSCH, a downlink synchronization signal, and/or a downlink reference signal from the signal input from the radio receiver 2057. The demultiplexer 2055 outputs the downlink reference signal to the channel measurement unit 2059. The demultiplexer 2055 performs propagation path compensation for the downlink channel from the propagation path estimation value input from the channel measurement unit 2059.

The demodulator 2053 demodulates the received signal using a modulation method such as BPSK, $\pi/2$ BPSK, QPSK, 16QAM, 64QAM, or 256QAM on the modulation symbol of the downlink channel. The demodulator 2053 performs separation and demodulation of MIMO multiplexed downlink channels.

The decoder 2051 performs decoding processing on the encoded bits of the demodulated downlink channel. The decoded downlink data and/or downlink control information is output to the controller 203. The decoder 2051 performs decoding processing for each transport block on the PDSCH.

The channel measurement unit 2059 measures a propagation path estimation value and/or channel quality from the downlink reference signal input from the demultiplexer 2055 and outputs it to the demultiplexer 2055 and/or the controller 203. The downlink reference signal used for measurement by the channel measurement unit 2059 may be determined based on at least the transmission mode set by RRC parameters and/or other RRC parameters. For example, DL-DMRS is used for measuring a propagation path estimation value for performing propagation path compensation for PDSCH or EPDCCH. CRS is used for measuring a propagation path estimation value for performing propagation path compensation for PDCCH or PDSCH, and/or a channel in the downlink for reporting CSI. CSI-RS is used for measuring a channel in the downlink for reporting CSI. The channel measurement unit 2059 calculates RSRP (Reference Signal Received Power) and/or RSRQ (Reference Signal Received Quality) based on the CRS, CSI-RS, or detection signal, and outputs the calculated value to the processor 201.

The transmitter 207 performs transmission processing such as encoding, modulation, and multiplexing on the uplink control information and uplink data input from the upper-layer processor 201 under the control of the controller 203. For example, the transmitter 207 generates and multiplexes uplink channels such as PUSCH or PUCCH and/or uplink reference signals, and generates transmission signals. The transmission processing in the transmitter 207 is performed based on predefined settings, or settings or notifications from the base station device 1. The transmitter 207 includes an encoder 2071, a modulator 2073, a multiplexer 2075, a radio transmitter 2077, and an uplink reference signal generator 2079.

The encoder 2071 encodes the HARQ indicator (HARQ-ACK), uplink control information, and uplink data input from the controller 203 using an encoding method such as block encoding, convolutional encoding, or turbo encoding. The modulator 2073 modulates the encoded bits input from the encoder 2071 using a modulation method such as BPSK, π/2 BPSK, QPSK, 16QAM, 64QAM, or 256QAM. The uplink reference signal generator 2079 generates an uplink reference signal based on the RRC parameters set in the terminal device 2 and the like.

The multiplexer 2075 multiplexes modulation symbols and uplink reference signals for each channel and arranges them in predetermined resource elements.

The radio transmitter 2077 performs processing on the signal from the multiplexer 2075, such as conversion to a time domain signal by DFT or IFFT, addition of guard intervals, generation of baseband digital signals, conversion to analog signals, orthogonal modulation, conversion (up-conversion) from an intermediate frequency signal to a high-frequency signal, removal of extra frequency components, and amplification of power and generates a transmission signal. The transmission signal output by the radio transmitter 2077 is transmitted from the antenna 209.

In the configuration described above, the signal waveform transmitted from the base station device 1 can be switched, but a configuration that can switch the signal waveform of the signal transmitted from the terminal device 2 may be added. In this case, the terminal device 2 may be equipped with the same radio transmitter configuration as the base station device 1 (see FIG. 6), and the base station device 1 may be equipped with the same radio receiver configuration as the terminal device 2 (see FIG. 10).

<Radio Frame Structure>

An example of the radio frame structure of the communication system according to the present embodiment will be described.

Figure 13:
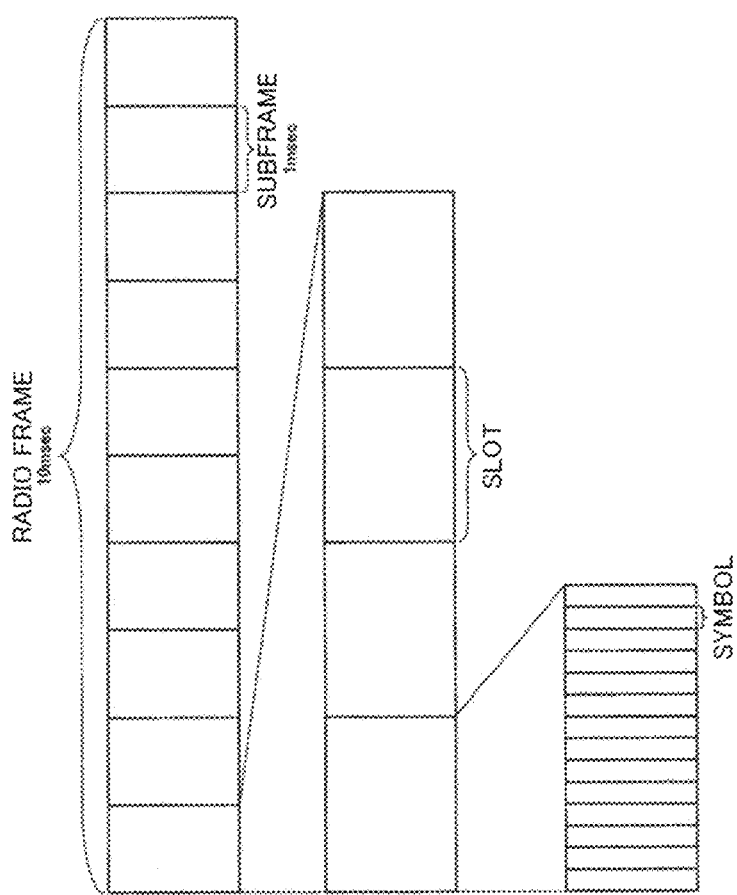
FIG. 13 is a diagram showing an example of an NR frame structure as a radio frame structure.

FIG. 13 shows an example of an NR frame structure as a radio frame structure. A radio frame has a time interval of 10 ms and includes two half-frames each with a time interval of 5 ms. Each half-frame includes five subframes. One subframe includes one or more slots. One slot includes 14 symbols in the case of a normal CP, and 12 symbols in the case of an extended CP.

<OFDM Transmission and DFT-S-OFDM Transmission>

An example of the operation of transmitting a signal from a transmitting device to a receiving device using OFDM transmission or DFT-S(Spread)-OFDM transmission used in 5G NR and the like will be explained.

Figure 14:
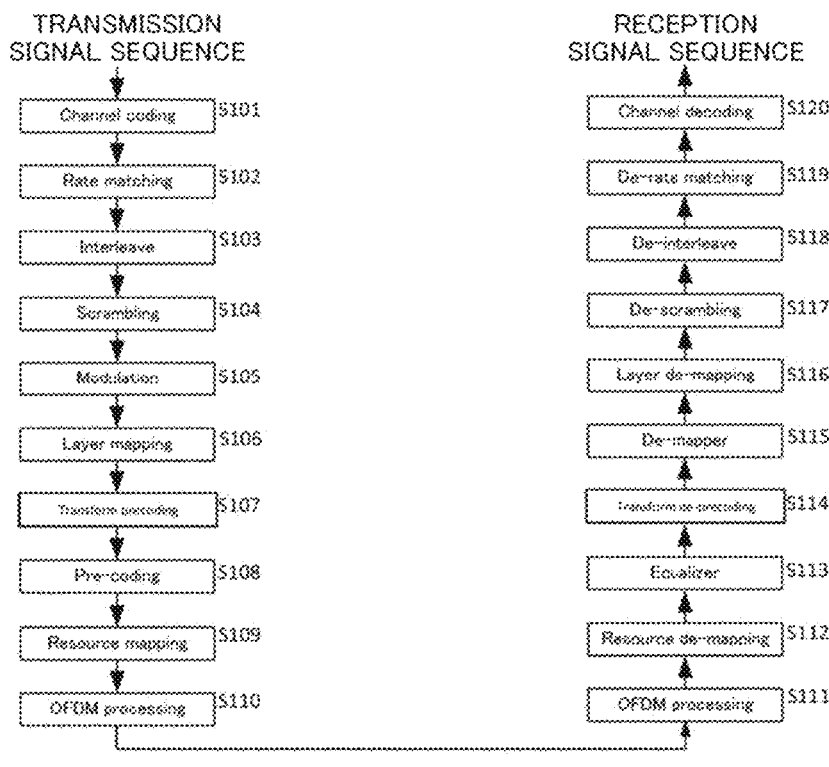
FIG. 14 is a diagram showing signal processing on the transmitting side and receiving side during 5G NR downlink or uplink transmission.

FIG. 14 shows an example of signal processing on the transmitting side and the receiving side during 5G NR downlink or uplink transmission. More specifically, FIG. 14 shows an example of physical layer signal processing performed in each of the transmitting device and the receiving device when performing downlink or uplink transmission. In the downlink, the transmitting device is the base station device 1, and the receiving device is the terminal device 2. In the uplink, the transmitting device is the terminal device 2 and the receiving device is the base station device 1.

In the transmitting device, error correction parity bits are added to the transmission signal sequence by error correction coding (ECC) (S101), and a number bits corresponding to the number of bits corresponding to the transmission resource and modulation method are extracted from the encoded bit string by rate matching (S102). Interleaving (S103) and scrambling (S104) are applied to the bit string including the extracted bits, and the bit string is mapped to complex signal points by modulation processing (S105). In the case of transmission in multiple layers (in the case of MIMO transmission), complex signal points are mapped to each layer (S106). Here, when performing DFT-S-OFDM transmission (that is, when transmitting a single-carrier signal), transform precoding, for example, DFT processing is performed (S107). The name transform precoding is just an example, and other names indicating DFT processing may be used. When performing OFDM transmission (that is, when transmitting a multi-carrier signal), transform precoding is omitted. Precoding (that is, setting of transmission weights) for beamforming is performed (S108), and resource mapping is performed on the precoded signal (S109). The signal after resource mapping is converted into a time-axis signal by OFDM processing (IDFT or IFFT, and the like), and the converted signal is transmitted.

The receiving device converts the received signal into a frequency domain signal by OFDM processing (DFT or FFT, and the like) (S111), performs resource demapping on the converted signal, and performs frequency equalization processing to eliminate distortion due to radio wave propagation (S113). When a signal is transmitted from a transmitting device using DFT-S-OFDM transmission, transform de-precoding, for example, IDFT processing, is further performed on the signal after distortion compensation. If the signal is transmitted from the transmitting device by OFDM transmission, the IDFT processing is omitted. After that, the signals mapped to multiple layers are returned (S115), the soft decision value of each bit is obtained from the complex signal point (S116), and descrambling (S117), deinterleaving (S118), de-rate matching (S119), and error correction decoding (S120) are executed.

One of the features of the embodiment of the present disclosure is that the base station device 1 notifies the terminal device 2 which of the first signal waveform and the second signal waveform is used in the initial connection procedure, and uses the notified signal waveform to perform downlink communication. As an example, the base station device 1 notifies the terminal device 2 in advance of Information (first information) regarding which signal waveform, the first signal waveform or the second signal waveform, is used in downlink communication for at least part of the initial connection procedure performed with the terminal device 2. The first information may be transmitted in association with a predetermined signal. Various types of predetermined signals can be considered, such as a synchronization signal, and the details will be described later. The base station device 1 performs downlink communication (downlink signal transmission) in the initial connection procedure with the terminal device 2 using a signal waveform based on the notified first information. The terminal device 2 receives the downlink communication signal using the reception processing for the signal waveform indicated in the first information notified from the base station device 1. Below, the initial connection procedure will be explained first.

<Initial Connection Procedure>

The initial connection procedure will be described below, divided into the following items.

<Outline of initial connection procedure (initial connection procedure)>

<System information>

<RACH procedure>

<Types of RACH procedures>

<Details of NR PRACH>

<Details of NR random access response>

<Details of NR message 3>

<Details of NR contention resolution>

<NR 2-step RACH procedure>

<Outline of Initial Connection Procedure (Initial Connection Procedure)>

The initial connection is a procedure performed for the terminal device 2 to transition from a state in which it is not connected to any cell (idle state) to a state in which it has established a connection with any cell (connected state).

Figure 15:
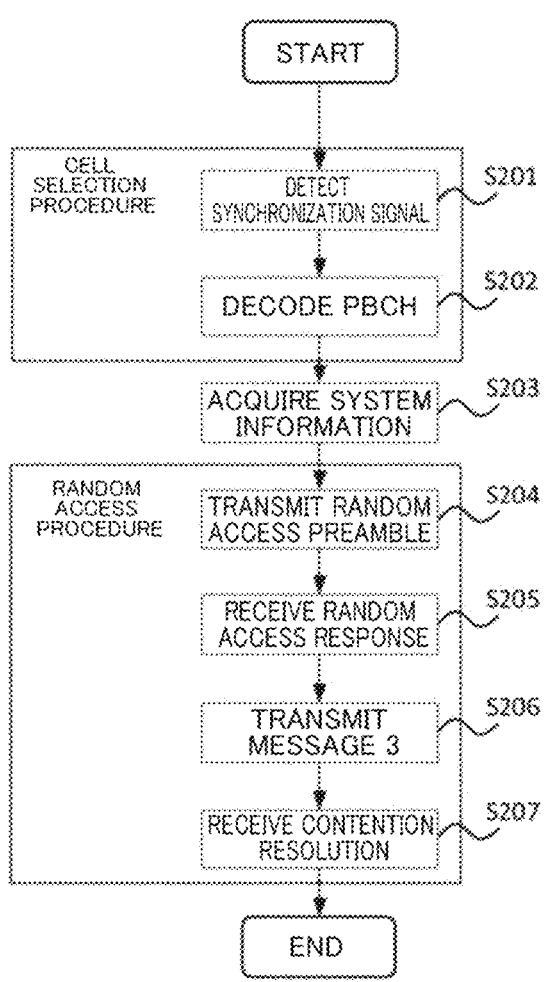
FIG. 15 is a diagram showing an example of an initial connection procedure for a terminal device.

FIG. 15 shows an example of an initial connection procedure for the terminal device 2.

The terminal device 2 in the idle state first performs a cell selection procedure. The cell selection procedure includes detection of a synchronization signal (S201) and decoding of a PBCH (Physical Broadcast Channel) (S202). The terminal device 2 performs downlink synchronization with the cell based on the detection of the synchronization signal. After establishing downlink synchronization, the terminal device attempts to decode the PBCH and acquires the first system information (S203). Furthermore, the terminal device 2 acquires second system information based on the first system information included in the PBCH (S203). Next, the terminal device 2 performs a random access procedure (random access procedure, RACH (Random Access Channel) procedure, RACH procedure) based on the first system information and/or the second system information. The random access procedure includes sending a random access preamble, receiving a random access response, sending message 3, and receiving a contention resolution. More details are as follows.

The terminal device 2 first selects a predetermined PRACH (Physical Random Access Channel) preamble and transmits the selected preamble (random access preamble) (S204). The random access preamble is transmitted in association with PRACH. The random access preamble is also referred to as message 1.

Next, a PDSCH (Physical Downlink Shared Channel) including a random access response corresponding to the PRACH preamble is received (S205). That is, the random access response is transmitted on the PDSCH. A PDSCH including a random access response is scheduled on a PDCCH (Physical Downlink Control Channel). The random access response is also referred to as message 2.

Next, the PUSCH including message 3 is transmitted using the resources scheduled by the random access response grant included in the random access response (S206). The PUSCH including message 3 is scheduled by the uplink grant included in the random access response. Message 3 includes an RRC (Radio Resource Control) message requesting an RRC connection.

Finally, the PDSCH including contention resolution corresponding to the PUSCH is received (S207). Contention resolution includes RRC messages for RRC connection setup. The contention resolution includes, for example, information regarding which terminal device the base station device 1 has connected to. Contention resolution is also referred to as message 4. The RRC connection setup complete message is also referred to as message 5.

When the terminal device 2 receives the RRC message for RRC connection setup, the terminal device 2 performs an RRC connection operation and transitions from the RRC idle state to the RRC connected state. After transitioning to the RRC connected state, the terminal device 2 transmits an RRC message indicating the completion of RRC connection setup to the base station device 1. Through this series of operations, the terminal device 2 can connect to the base station device 1. That is, after all steps of the random access procedure are completed, the terminal device 2 can transition to a state where it is connected to the cell (connected state).

The random access procedure in FIG. 15 is also referred to as a 4-step RACH procedure. On the other hand, the random access procedure in which the terminal device 2 sends the message 3 along with the transmission of the random access preamble (message 1), and the base station device 1 sends a random access response (message 2) and a contention resolution (message 4) as a response is referred to as a 2-step RACH procedure. As an initial connection procedure for the terminal device 2, it is also possible to perform a 2-step RACH procedure (see FIG. 18 described later).

<System Information>

The system information transmitted from a cell is information that broadcasts settings in the cell. The system information includes, for example, information regarding access to the cell, information regarding cell selection, information regarding other RATs (Radio Access Technology) and other systems, and the like.

System information can be classified into MIB (Master Information Block) and SIB (System Information Block). MIB is information on a fixed payload size that is broadcast via PBCH. The MIB includes information for acquiring the SIB. SIB is system information other than MIB. SIB is broadcast by PDSCH.

In addition, the system information can be classified into first system information, second system information, and other system information (third system information and the like). The first system information and the second system information include information regarding access to the cell for transmitting these pieces of system information, information regarding acquisition of other system information (third system information), and information regarding cell selection. The information included in the MIB can be considered as first system information, and the information included in SIB1 can be considered as second system information. If the terminal device cannot acquire the first system information from the cell, it is assumed that access to the cell is prohibited.

The MIB is physical layer information necessary to receive system information such as second system information. The MIB includes a part of the system frame number, subcarrier spacing information (at least message 2/4 for SIB1 and initial connection and paging and broadcast SI message subcarrier spacing information), subcarrier offset information, DMRS type A position information, PDCCH settings for at least SIB1, cell barred information, and intra-frequency reselection information.

SIB1 includes information regarding cell selection, information regarding cell access, information regarding connection establishment failure control, scheduling information of system information other than SIB1, serving cell settings, and the like. The serving cell configuration includes cell-specific parameters, such as downlink configuration, uplink configuration, TDD configuration information, and the like. Uplink settings include RACH settings and the like.

<Rach Procedure>

The random access procedure (RACH procedure) is performed to achieve the following objectives, for example.

RRC connection setup from idle state to inactive or connected state

Request for state transition from inactive state to connected state

Handover to switch connected cells

Scheduling request to request resources for uplink data transmission

Timing advance adjustment to adjust uplink synchronization

On-demand SI requests requesting system information that has not been sent

Recovery of interrupted beam connection (beam recovery)

RRC connection setup from an idle state to an inactive state or a connected state is an operation performed when a terminal device connects to a base station device in response to the occurrence of traffic. Specifically, this operation is an operation in which connection information (for example, UE context) is passed from the base station device to the terminal device. The UE context is managed using predetermined terminal device identification information (for example, C-RNTI) instructed by the base station device. When the terminal device completes this operation, the terminal device transitions from an idle state to an inactive state or from an idle state to a connected state.

The request for a state transition from an inactive state to a connected state is a request for a state transition from an inactive state to a connected state in response to the occurrence of traffic. By transitioning to the connected state, the terminal device can transmit and receive unicast data to and from the base station device.

Handover, which switches the connected cell, is an operation that switches the connection from a connected cell (serving) to a cell adjacent to the cell (neighbor cell) due to changes in the radio wave environment such as movement of the terminal device. The terminal device that receives the handover command from the base station device makes a connection request to the neighbor cell specified by the handover command.

The scheduling request is an operation for requesting resources for uplink data transmission depending on the occurrence of traffic. After successfully receiving this scheduling request, the base station device allocates PUSCH resources to the terminal device. Note that the scheduling request is also made by PUCCH.

Timing advance adjustment for adjusting uplink synchronization is an operation for adjusting frame errors between downlink and uplink caused by propagation delay. The terminal device transmits the PRACH at a timing adjusted with respect to the downlink frame. Accordingly, the base station device can recognize the propagation delay with the terminal device, and can instruct the terminal device about the timing advance value using message 2 or the like. The timing advance value is an example of information regarding the transmission timing of the terminal device in the uplink.

An on-demand SI request that requests system information that has not been transmitted is a request for a terminal device to transmit system information to a base station device when the terminal device needs system information that has not been transmitted due to system information being overhead, for example.

Recovery of interrupted beam connection (beam recovery) is an operation that requests the recovery of a beam when the communication quality deteriorates due to movement of the terminal device or interruption of the communication path by another object after the beam has been established. The base station device that receives this request tries to connect to the terminal device using a different beam.

<Types of RACH Procedures>

Random access procedures (RACH procedures) include contention-based RACH procedures and non-contention-based RACH procedures.

Figure 16:
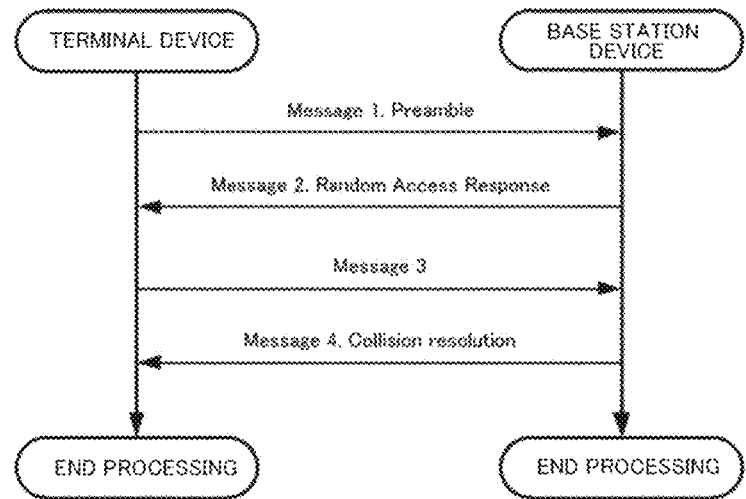
FIG. 16 is a diagram showing an example of a contention-based RACH procedure.

FIG. 16 shows an example of a contention-based RACH procedure. The contention-based RACH procedure is a RACH procedure performed under the initiative of the terminal device. The contention-based RACH procedure is a 4-step procedure starting with sending message 1 from the terminal device. The terminal device selects a RACH resource and a PRACH preamble from a plurality of preset RACH resources and a plurality of PRACH preambles, and transmits the selected RPA preamble (that is, transmits the PRACH) using the selected RACH resource. The subsequent steps for transmitting and receiving messages 2 to 4 are similar to those described in FIG. 15 above. Since these multiple RACH resources and multiple PRACH preambles are shared with other terminal devices, PRACHs transmitted from the terminal device may collide.

Figure 17:
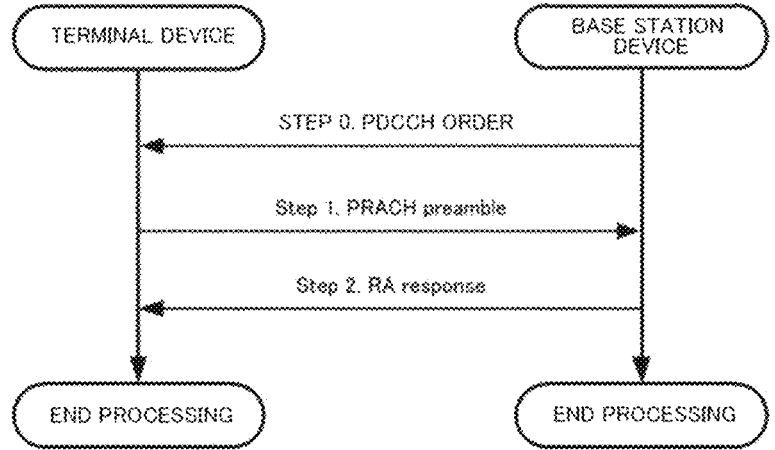
FIG. 17 is a diagram showing an example of a non-contention-based RACH procedure.

FIG. 17 shows an example of a non-contention-based RACH procedure. The non-contention-based RACH procedure is a RACH procedure performed under the initiative of the base station device. The non-contention-based RACH procedure can be used, for example, when causing a terminal device to perform handover. The non-contention-based RACH procedure is a 3-step procedure starting with the transmission of a PDCCH order from the base station device. A PDCCH order is transmitted from the base station device, and the terminal device transmits PRACH using the PRACH preamble specified in the PDCCH order. The base station device that receives the PRACH transmits a random access response (RA response) to the terminal device. Since the base station device schedules the PRACH preamble, the possibility of PRACH contention occurring is low.

<Details of NR-PRACH>

PRACH in NR (NR-PRACH) is configured using the Zadoff-Chu sequence. In NR-PRACH, multiple preamble formats are defined. The preamble format is defined by a combination of parameters such as PRACH subcarrier spacing, transmission bandwidth, sequence length, number of symbols used for transmission, number of transmission repetitions, CP length, and guard period length.

For a terminal device in an idle mode, settings regarding NR-PRACH are made using system information. Furthermore, settings regarding the NR-PRACH are made for the terminal device in the connected mode by dedicated RRC signaling.

NR-PRACH is transmitted using physical resources (frequency and time resources referred to as NR-PRACH occasions) that can transmit NR-PRACH. The physical resources are indicated by the configuration for NR-PRACH. The terminal device selects one of the physical resources and transmits the NR-PRACH. Furthermore, the terminal device in a connected mode transmits NR-PRACH using NR-PRACH resources. The NR-PRACH resource is a combination of the NR-PRACH preamble and the physical resources of the preamble. The base station device can instruct the terminal device to use the NR-PRACH resource.

Numbers are assigned to the types of NR-PRACH preamble sequences. The NR-PRACH preamble sequence type number is referred to as a preamble index.

NR-PRACH is retransmitted when the random access procedure fails. When retransmitting the NR-PRACH, the terminal device waits for transmission of the NR-PRACH for a waiting period calculated from the backoff value (backoff indicator: BI). The backoff value may differ depending on the terminal device category of the terminal device and/or the priority of the generated traffic. A plurality of backoff values are notified to the terminal device, and the terminal device selects the backoff value to be used depending on the priority. Furthermore, when retransmitting the NR-PRACH, the terminal device increases the transmission power of the NR-PRACH compared to the transmission power at the time of initial transmission. This operation is referred to as power ramping.

<Details of NR Random Access Response>

The NR random access response is sent on the NR-PDSCH.

NR-PDSCH containing random access response is scheduled by NR-PDCCH. The CRC of the NR-PDCCH is scrambled by the RA-RNTI. NR-PDCCH is transmitted on the common control subband. NR-PDCCH is arranged in CSS (Common Search Space). Note that the value of RA-RNTI is determined based on the transmission resources (time resources (slots or subframes) and frequency resources (resource blocks)) of the NR-PRACH corresponding to the random access response. Note that the NR-PDCCH may be arranged in a search space associated with the NR-PRACH associated with the random access response. Specifically, the search space in which the NR-PDCCH is arranged is set in association with the preamble of the NR-PRACH and/or the physical resource on which the NR-PRACH is transmitted. The search space in which the NR-PDCCH is allocated is set in association with its preamble index and/or its physical resource index.

The NR-PDCCH is QCL (Quasi Co-Location) with respect to NR-SS (Synchronization Signal).

The NR random access response is MAC information. The NR random access response includes at least an uplink grant for transmitting the NR message 3, a timing advance value used to adjust uplink frame synchronization, and a temporary C-RNTI value. In addition, the NR random access response includes the PRACH index used in the NR-PRACH transmission corresponding to the random access response. The NR random access response also includes information regarding backoff used for waiting for PRACH transmission. The base station device transmits an NR random access response including this information on the NR-PDSCH.

The terminal device determines whether the transmission of the random access preamble is successful or not from the information included in the NR random access response. If the terminal device determines that the transmission of the random access preamble has been successful, the terminal device performs the processing of transmitting the NR message 3 according to the information included in the random access response. On the other hand, if the terminal device determines that the random access preamble transmission has failed, the terminal device considers that the random access procedure has failed and performs the NR-PRACH retransmission processing.

Note that the NR random access response may include a plurality of uplink grants for transmitting the NR message 3.

The terminal device can select one resource to transmit message 3 from a plurality of uplink grants. Accordingly, when a plurality of terminal devices receives the same random access response, it is possible to reduce or alleviate the possibility that messages 3 transmitted from the plurality of terminal devices will collide at the base station device. Accordingly, a more stable random access procedure can be provided.

<Details of NR Message 3>

NR message 3 is sent on the NR-PUSCH. NR-PUSCH is transmitted using the resources indicated by the random access response.

NR message 3 includes an RRC connection request message.

The waveform or transmission method of the NR-PUSCH transmitted including the NR message 3 is specified by parameters included in the system information. Specifically, OFDM (multi-carrier signal) or DFT-s-OFDM (single-carrier signal) is determined according to parameter instructions.

When the base station device normally receives the NR message 3, it proceeds to transmission processing for contention resolution. On the other hand, if the base station device cannot normally receive the NR message 3, the base station device can try to receive the NR message 3 again for at least a predetermined period.

An example of an instruction in the case of instructing retransmission of message 3 and instructing transmission resources is an instruction using NR-PDCCH. The NR-PDCCH includes an uplink grant. The DCI of the NR-PDCCH indicates the resource for retransmitting message 3. The terminal device retransmits message 3 based on the uplink grant instructions.

Note that, if the terminal device does not successfully receive the NR contention resolution within a predetermined period, the terminal device considers that the random access procedure has failed, and performs the NR-PRACH retransmission processing.

Note that the transmission beam of the terminal device used to retransmit the NR message 3 may be different from the transmission beam of the terminal device used to transmit the message 3 for the first time.

Note that, if the terminal device fails to receive either the NR contention resolution or the message 3 retransmission instruction within a predetermined period, the terminal device considers that the random access procedure has failed and performs the NR-PRACH retransmission processing. The predetermined period is set, for example, by system information.

<Details of NR Contention Resolution>

NR contention resolution is sent on the NR-PDSCH.

NR-PDSCH including contention resolution is scheduled by NR-PDCCH. The CRC of the NR-PDCCH is scrambled by the temporary C-RNTI or C-RNTI. NR-PDCCH is arranged in USS (terminal device-specific search space). Note that the NR-PDCCH may be placed in the CSS.

When the terminal device successfully receives the NR-PDSCH including contention resolution, the terminal device responds with an ACK to the base station device. Thereafter, the terminal device assumes that this random access procedure has been successful and enters a connected state. On the other hand, if the base station device receives a NACK for the NR-PDSCH including contention resolution from the terminal device, or if there is no response from the terminal device, the base station device retransmits the NR-PDSCH including contention resolution. Furthermore, if the terminal device cannot receive the NR contention resolution within a predetermined period, the terminal device considers that the random access procedure has failed and performs the NR-PRACH retransmission processing.

<NR 2-Step RACH Procedure>

Figure 18:
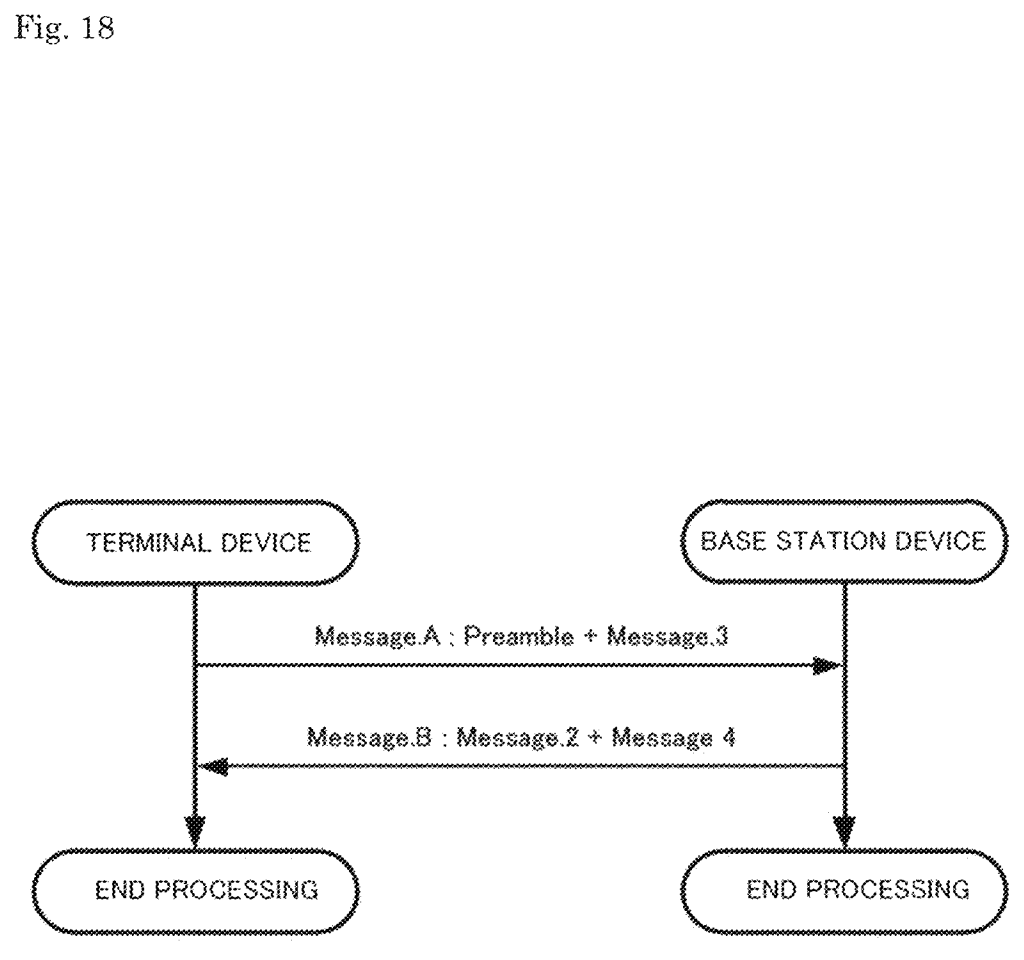

FIG. 18 is a sequence diagram showing an example of the NR 2-step RACH procedure. The 2-step RACH procedure consists of two steps: transmission of message A (Message.A) from the terminal device and transmission of message B (Message.B) from the base station device. As an example, message A includes message 1 (Preamble) and message 3 in the conventional 4-step RACH, and message B includes message 2 and message 4 in the conventional 4-step RACH. Furthermore, as an example, message A is configured with PRACH (Preamble) and PUSCH, and message B is configured with PDSCH.

By adopting a 2-step random access procedure, it becomes possible to complete the random access procedure with lower latency than the conventional 4-step random access procedure.

Regarding the Preamble and PUSCH (message 3) included in Message.A, respective transmission resources may be set in association with each other, or respective independent resources may be set.

When transmission resources are set in association, for example, when a Preamble transmission resource is determined, a PUSCH transmission resource that can be a unique candidate or a plurality of candidates is determined. As an example, the time offset and frequency offset between the Preamble of the PRACH occasion and the PUSCH occasion are determined by one value. As another example, the time offset and frequency offset between the Preamble of the PRACH occasion and the PUSCH occasion are determined to have different values for each preamble. The offset value may be determined according to specifications, or may be set quasi-statically by the base station device. As an example of the values of the time offset and the frequency offset, they are defined depending on the frequency to be used, for example. For example, in an unlicensed band (5 GHz band, band 45), the time offset value can be set to 0 or a value close to 0. In this way, it is possible to omit LBT (Listen Before Talk) before transmitting the PUSCH.

On the other hand, when independent resources are configured, the transmission resources for Preamble and PUSCH may be determined based on the specifications. Alternatively, each transmission resource may be semi-statically set by the base station device, or each transmission resource may be determined from other information. Other information includes, for example, Slot format information (Slot Format Indicator, etc.), Band Width Part (BWP) information, Preamble transmission resource information, Slot Index, and Resource Block Index. In addition, if independent resources are set, the association between the Preamble constituting one Message.A and the PUSCH (message 3) may be notified to the base station by the payload of the PUSCH or the UCI included in the PUSCH. Alternatively, the association may be notified to the base station by the transmission physical parameters of the PUSCH. The transmission physical parameters include, for example, a PUSCH scrambling sequence, a DMRS sequence and/or pattern, and a PUSCH transmission antenna port.

In addition, regarding the setting method of transmission resources for Preamble and PUSCH, it may be possible to switch between a case where they are set in association with each other and a case where they are set as independent resources. For example, in a licensed band, a case where independent resources are set may be applied, and in an unlicensed band, a case where transmission resources are set in association may be applied.

<Communication Processing Flow>

Figure 19:
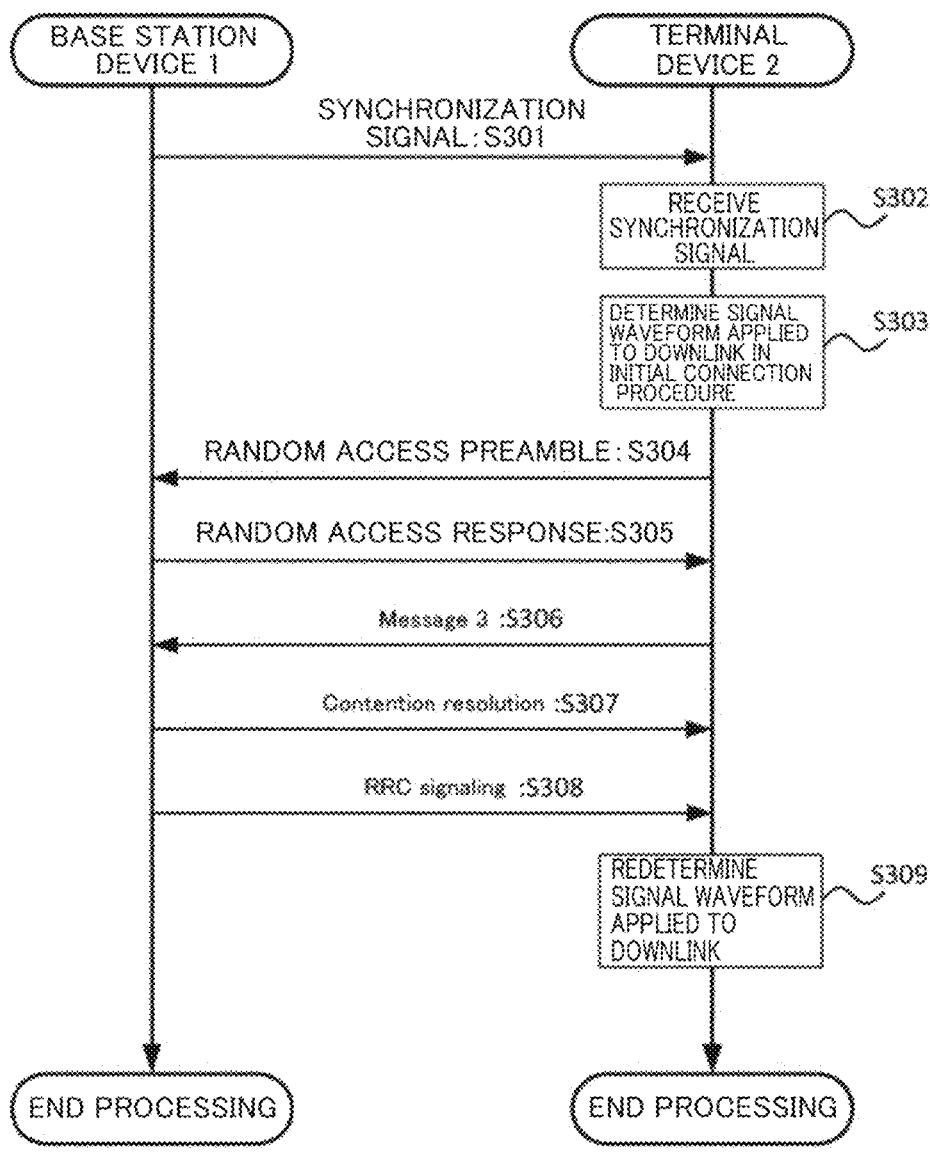
FIG. 19 is a sequence diagram showing an example of the flow of communication processing according to the embodiment of the present disclosure.

FIG. 19 is a sequence diagram illustrating an example of the flow of communication processing in the radio communication system according to the embodiment of the present disclosure. This communication processing includes an initial connection procedure (S301 to S306) of the terminal device 2 performed with the base station device 1, and arbitrary processing in the subsequent time segment (S307, S308).

A synchronization signal is transmitted from the base station device 1 with a predetermined signal waveform (S301), and the terminal device 2 receives (detects) this synchronization signal (S301). After establishing downlink synchronization, the terminal device 2 attempts to decode a PBCH (Physical Broadcast Channel) and acquires the first system information. Furthermore, the terminal device 2 acquires second system information (for example, SIB) based on the first system information included in the PBCH. SIB is broadcast by PDSCH.

The terminal device 2 determines the signal waveform to be used by the base station device 1 in subsequent downlink communications in the initial connection procedure (S303). The signal waveform is, for example, either a second signal waveform including a single-carrier signal or a first signal waveform including a multi-carrier signal. Information regarding the signal waveform to be used (first information or signal waveform identification information) is associated with a predetermined signal transmitted from the base station device 1, and is acquired in advance by the terminal device 2 at an arbitrary timing (for example, from step S101 to step S303). That is, the base station device 1 determines which of the first signal waveform and the second signal waveform to be used in downlink communication in the initial connection procedure, and transmits information (first information or signal waveform identification information) regarding the determined signal waveform to the terminal device 2 in association with a predetermined signal. Examples of the predetermined signal include the above-mentioned synchronization signal, PBCH, or PDSCH. Details of the predetermined signal and signal waveform identification information will be described later.

The terminal device 2 performs a random access procedure (RACH procedure) based on the first system information and/or the second system information. The random access procedure is basically the same as steps S204 to S207 in FIG. 15. However, in the processing flow of FIG. 19, the base station device 1 controls the radio transmitter 1077 (see FIG. 10) to perform transmission processing using the signal waveform notified to the terminal device 2 in advance. The terminal device 2 controls the radio receiver 2057 (see FIG. 15) to perform reception processing for the signal waveform determined in step S303.

Specifically, the terminal device 2 first selects a predetermined PRACH (Physical Random Access Channel) preamble and transmits the selected preamble (random access preamble) (S304). The random access preamble is transmitted in association with PRACH. The random access preamble is also referred to as message 1.

As downlink communication, the base station device 1 transmits a PDSCH (Physical Downlink Shared Channel) including a random access response corresponding to the PRACH preamble using a signal waveform notified to the terminal device 2 in advance (S305). Specifically, when transmitting the second signal waveform (single-carrier signal), the base station device 1 sets the output destination of the signal waveform switch 401 to the second signal waveform transmitter 405. When transmitting the first signal waveform (multi-carrier signal), the base station device 1 sets the output destination of the signal waveform switch 401 to the first signal waveform transmitter 403.

The terminal device 2 receives the PDSCH including the random access response using the reception processing for the signal waveform determined in step S303 (step S305). That is, when receiving a single-carrier signal, the terminal device 2 sets the output destination of the signal waveform switch 301 to the second signal waveform receiver 305. When receiving a multi-carrier signal, the terminal device 2 sets the output destination of the signal waveform switch 301 to the first signal waveform receiver 303. Note that the PDSCH including the random access response is scheduled on the PDCCH (Physical Downlink Control Channel). The random access response is also referred to as message 2.

The terminal device 2 transmits the PUSCH including the message 3 using the resources scheduled by the random access response grant included in the random access response (S306). The PUSCH including message 3 is scheduled by the uplink grant included in the random access response. Message 3 includes an RRC (Radio Resource Control) message requesting an RRC connection.

In downlink communication, the base station device 1 transmits a PDSCH including contention resolution corresponding to the PUSCH using the above-mentioned signal waveform (S307). Specifically, when transmitting a single-carrier signal, the base station device 1 sets the output destination of the signal waveform switch 401 to the second signal waveform transmitter 405. When transmitting a multi-carrier signal, the base station device 1 sets the output destination of the signal waveform switch 401 to the first signal waveform transmitter 403.

The terminal device 2 receives the PDSCH including contention resolution using the reception processing for the signal waveform determined in step S303 (step S307). That is, when receiving a single-carrier signal, the output destination of the signal waveform switch 301 is set to the second signal waveform receiver 305. When receiving a multi-carrier signal, the output destination of the signal waveform switch 301 is set to the first signal waveform receiver 303. Contention resolution includes RRC messages for RRC connection setup. The contention resolution includes, for example, information regarding which terminal device is connected. Contention resolution is also referred to as message 4. The RRC connection setup complete message is also referred to as message 5.

When the terminal device 2 receives the RRC message for RRC connection setup, the terminal device 2 performs an RRC connection operation and transitions from the RRC idle state to the RRC connected state. After transitioning to the RRC connected state, the terminal device 2 transmits an RRC message indicating the completion of RRC connection setup to the base station device 1. Through this series of operations, the terminal device 2 can connect to the base station device 1. That is, after all steps of the random access procedure are completed, the terminal device 2 can transition to a state where it is connected to the cell (connected state).

The base station device 1 re-determines the signal waveform to be used in downlink communication in an arbitrary time segment after completion of the initial connection, and transmits information (first information or signal waveform identification information) regarding the determined signal waveform to the terminal device 2 in association with a predetermined signal (S308). In the illustrated example sequence, the predetermined signal is RRC signaling (RRC message or RRC parameter). The signal waveform of RRC signaling may be a predetermined signal waveform, or the same signal waveform as before may be used continuously as long as there is no change in the signal waveform to be used. In the latter case, the base station device 1 performs RRC signaling using the same signal waveform as the signal waveform to be used in the previous downlink communication.

Thereafter, the base station device 1 may repeatedly perform processes similar to steps S308 and S309 at an arbitrary timing or periodically to switch the signal waveform to be used.

Note that the signal waveform identification information may be in the form of explicit information or implicit information. For example, if the frequency (channel) of a signal received from the base station device 1 itself also serves as signal waveform identification information, the signal waveform identification information can be said to be implicit information. Details of the signal waveform identification information will be described later.

In the operation example of FIG. 19, the base station device 1 transmits signal waveform identification information (first information) to the terminal device 2, and transmits a signal with the signal waveform indicated by the signal waveform identification information after transmitting the signal waveform identification information. That is, the signal transmitted using the signal waveform is a signal different from the predetermined signal for which the signal waveform identification information is notified. As another example, the signal waveform identification information may be included in the signal itself transmitted using the signal waveform. In this case, the signal waveform identification information is detected in the signal waveform switch 301 in the radio receiver 2057 of the terminal device 2 or in the processing at the preceding stage thereof.

Although FIG. 19 shows an example in which a 4-step RACH procedure is performed as an initial connection procedure, a similar operation is possible when a 2-step RACH procedure is performed. That is, the base station device 1 determines a signal waveform to be used in downlink communication in an initial procedure, and transmits information (first information or signal waveform identification information) regarding the determined signal waveform to the terminal device 2. The terminal device 2 determines the signal waveform to be transmitted from the base station device 1 in the initial procedure based on the information. In the subsequent procedure in the 2-step RACH, the terminal device 2 receives the downlink signal transmitted from the base station device 1 using the reception processing for the signal waveform determined by the determination.

In the initial connection procedure of FIG. 19, after the transmission/reception of the synchronization signal, at least one of the following is included, for example.

PBCH transmission/reception
PDSCH transmission/reception
PDCCH transmission/reception
4-step RACH procedure or 2-step RACH procedure
<Single-Carrier Signal and Multi-Carrier Signal>

Single-carrier signals and multi-carrier signals will be explained in detail. The single-carrier signal or the second signal waveform is a signal that has been subjected to transform precoding, and the multi-carrier signal or the first signal waveform is a signal that has not been subjected to transform precoding. More specifically, a single-carrier signal is a signal that has been subjected to transform precoding before OFDM processing (here, IDFT or IFFT) on the transmitting side. A multi-carrier signal is a signal that has not been subjected to transform precoding before OFDM processing (here, IDFT or IFFT) on the transmitting side. As an example, the transform precoding is DFT or FFT. In other words, a single-carrier signal is a signal that is subjected to IDFT or FFT after OFDM processing (here, DFT or FFT) on the receiving side. A multi-carrier signal is a signal that is not subjected to IDFT or FFT after OFDM processing (here, DFT or FFT) on the receiving side.

Examples of single-carrier signals include a DFT-S-OFDM signal (SC-FDMA signal), an SC-QAM signal, a single-carrier with zero padding/unique word, and the like. Examples of multi-carrier signals include OFDM signals or CP-OFDM signals.

In the present embodiment, during the initial connection procedure and other time segments, it is possible to selectively switch between a single-carrier signal and a multi-carrier signal as a signal waveform to be used in downlink communication. However, the types of signal waveforms used in downlink communication are not limited to single-carrier signals and multi-carrier signals. Generally, as a signal waveform to be used in downlink communication, at least a first signal waveform and a second signal waveform can be selectively switched. It may also be possible to selectively switch between three or more signal waveforms.

As an example, the first signal waveform is a multi-carrier signal and the second signal waveform is a single-carrier signal. The first signal waveform is not limited to a multi-carrier signal, and may be a signal waveform different from the multi-carrier signal. For example, the first signal waveform may be a signal waveform using a method other than OFDM as secondary modulation, such as, for example, CDMA (Code Division Multiple Access) signals, DS (Direct Sequence or Direct Spread) signals, DS-CDMA (Direct Spread-Code Division Multiple Access), or FF signals (Frequency Hopping). In addition, the first signal waveform may be a signal waveform in which primary modulation is performed and secondary modulation is not performed, for example.

<Example of Predetermined Signal>

An example of a predetermined signal regarding signal waveform identification information (first information) is shown below. The predetermined signal is not limited to the signals shown below.

PSS (Primary Synchronization Signal), SSS (Secondary Synchronization signal), TSS (Tertiary Synchronizations) signal) or other synchronization signal
  PBCH (Physical Broadcast channel)
  PDSCH (Physical Downlink Shared Channel), for example, PDSCH including SI (System Information)
  RS (Reference Signal) For example, DMRS transmitted in conjunction with at least one of PBCH and PDSCH
  Newly defined signal that notifies the terminal device of the signal waveform to be used in the downlink <Example of Signal Waveform Identification Information and Operation Example of Base Station Device 1 and Terminal Device 2 Regarding Signal Waveform Identification Information>

Examples of signal waveform identification information are shown below. In addition, for each example of signal waveform identification information, an operation example in which the base station device 1 transmits the signal waveform identification information, and an operation example in which the terminal device 2 determines the signal waveform based on the signal waveform identification information and switches reception processing is shown. Note that the signal waveform identification information is not limited to the information shown below as long as it is information that allows the terminal device 2 to identify or recognize the signal waveform.

[1] Information Regarding Generation of Sequence of PSS, SSS, TSS or Other Synchronization Signals The base station device 1 includes a determination term representing either the first signal waveform or the second signal waveform in the generation formula for the sequence of PSS, SSS, TSS, or other synchronization signals. The determination term may be expressed by, for example, 1 bit.

For example, when using the first signal waveform for downlink communication in the initial connection procedure, the base station device 1 includes the determination term representing the first signal waveform in the generation formula for the sequence of any of the synchronization signals described above. After transmitting any of the synchronization signals described above, the base station device 1 transmits a signal with the first signal waveform in downlink communication in the initial connection procedure. When the base station device 1 uses the second signal waveform for downlink communication in the initial connection procedure, the base station device 1 includes a determination term representing the second signal waveform in the generation formula for the sequence of any of the synchronization signals described above. After transmitting any of the synchronization signals described above, the base station device 1 transmits a signal with the second signal waveform in downlink communication in the initial connection procedure.

The terminal device 2 on the receiving side detects the determination term included in the information received from the base station device 1 (the generation formula for the sequence of any of the synchronization signals described above), thereby determining which of the first signal waveform or the second signal waveform will be used in downlink communication during the initial connection procedure. If the determination term indicates the first signal waveform, the terminal device 2 switches the output destination of the signal waveform switch 301 to the first signal waveform receiver 303. Accordingly, the terminal device 2 sets reception processing for the first signal waveform. If the determination term indicates the second signal waveform, the output destination of the signal waveform switch 301 is switched to the second signal waveform receiver 305. Accordingly, the terminal device 2 sets reception processing for the second signal waveform. Thereafter, the terminal device 2 receives the signal transmitted by downlink communication from the base station device 1 using the set reception processing (reception processing for the first signal waveform or the second signal waveform).

After the initial connection procedure is completed, the base station device 1 may continue to use the same signal waveform. If the signal waveform is set during the initial connection procedure, the base station device 1 may use the set signal waveform. If a default signal waveform exists, the default signal waveform may be restored.

Although an example of switching (or controlling) the signal waveform to be used in the initial connection procedure has been described here, similar processing is also possible when switching the signal waveform to be used in an arbitrary time segment after the initial connection procedure.

[2] Information Regarding Frequency Resource on which Predetermined Signal is Transmitted Information regarding frequency resources is information that specifies frequency resources, such as subcarriers, resource blocks, component carriers, and BWPs (Band Width Parts). In addition, the information regarding the frequency resource may be information regarding the size of the frequency resource, such as the number of subcarriers or the number of resource blocks.

The base station device 1 controls (switches) the signal waveform to be used in the initial connection procedure according to the frequency resource for transmitting a predetermined signal. Hereinafter, an example in which the frequency resources are resource blocks will be explained, but any information regarding the frequency resources is applicable without being limited to resource blocks. For example, when transmitting a predetermined signal using a specific resource block, the base station device 1 performs downlink communication in the initial connection procedure using the first signal waveform. That is, after transmitting a predetermined signal, the base station device 1 transmits a signal with the first signal waveform in downlink communication in the initial connection procedure. When transmitting a predetermined signal using a resource block different from a specific resource block, the base station device 1 performs downlink communication in the initial connection procedure using the second signal waveform. That is, after transmitting a predetermined signal, the base station device 1 transmits a signal with the second signal waveform in downlink communication in the initial connection procedure. Note that the predetermined signal itself is transmitted with an arbitrary signal waveform or a predetermined signal waveform. In the description of this paragraph, the first signal waveform and the second signal waveform may be reversed.

The terminal device 2 controls reception processing used for downlink reception in the initial connection procedure, depending on the resource block that receives a predetermined signal. For example, if the resource block that received the predetermined signal is a specific resource block, the terminal device 2 uses the reception processing for the second signal waveform to receive downlink communication in the initial connection procedure. If the resource block to which the predetermined signal is transmitted is not a specific resource block, the downlink communication in the initial connection procedure is received using the reception processing for the first signal waveform. Note that the resource block is specified by a resource block index. In the description of this paragraph, the first signal waveform and the second signal waveform may be reversed.

Information regarding the frequency resource on which a predetermined signal is transmitted may be notified from the base station device 1 to the terminal device 2 before transmitting the predetermined signal or in a state of being included in the predetermined signal, or such notification may be unnecessary. In this case, the terminal device 2 may detect the frequency resource on which the predetermined signal is received. In this case, the base station device 1 does not need to explicitly transmit information regarding the frequency resource on which the predetermined signal is transmitted.

Furthermore, the base station device 1 controls the signal waveform to be used in the initial connection procedure according to the number of resource blocks transmitting a predetermined signal. For example, when the number of resource blocks that transmit a predetermined signal is a predetermined number, the base station device 1 performs downlink communication in the initial connection procedure using the first signal waveform. That is, after transmitting a predetermined signal, the base station device 1 transmits a signal with the first signal waveform in downlink communication in the initial connection procedure. If the number of resource blocks that transmit the predetermined signal is not the predetermined number, the base station device 1 performs downlink communication in the initial connection procedure using the second signal waveform. That is, after transmitting a predetermined signal, the base station device 1 transmits a signal with the second signal waveform in downlink communication in the initial connection procedure. The predetermined signal itself is transmitted with an arbitrary signal waveform or a predetermined signal waveform. In the description of this paragraph, the first signal waveform and the second signal waveform may be reversed.

The terminal device 2 controls reception processing used in downlink communication in the initial connection procedure according to the number of resource blocks in which a predetermined signal has been received. For example, when the number of resource blocks in which a predetermined signal has been received is a predetermined value, the terminal device 2 uses the reception processing for the first signal waveform to receive downlink communication in the initial connection procedure. If the number of symbols in which the predetermined signal is received is not the predetermined number, reception processing for the second signal waveform is used to receive downlink communication in the initial connection procedure. In the description of this paragraph, the first signal waveform and the second signal waveform may be reversed.

Information regarding the number of resource blocks to which a predetermined signal is transmitted may be notified from the base station device 1 to the terminal device 2 before transmitting the predetermined signal or in a state of being included in the predetermined signal, or such notification may be unnecessary. In this case, the terminal device 2 may detect the number of resource blocks in which a predetermined signal has been received from the received predetermined signal. In this case, the base station device 1 does not need to explicitly transmit information regarding the resource block to which the predetermined signal is transmitted.

In the initial connection procedure or an arbitrary time segment thereafter, the base station device 1 may control the signal waveform to be used according to the resource block or the number of resource blocks to be used each time downlink communication is performed. The terminal device 2 may control reception processing applied to the signal received from the base station device 1 according to the resource block or the number of resource blocks of the received signal. Accordingly, the base station device 1 and the terminal device 2 can selectively switch the signal waveform to be used and reception processing each time downlink communication is performed.

[3] Information Regarding Time Resources in which Predetermined Signal is Transmitted Information regarding time resources information that specifies time resources, such as, for example, symbols, mini-slots (non-slot-based), slots, subframes, frames, or radio frames. In addition, the information regarding the time resource may be information regarding the size of the time resource, such as the number of symbols or the number of slots.

The base station device 1 controls the signal waveform to be used in the initial connection procedure according to the time resource for transmitting a predetermined signal. For example, when transmitting a predetermined signal using a specific time resource (for example, a symbol), the base station device 1 performs downlink communication in the initial connection procedure using the first signal waveform.

In other words, when using the first signal waveform in downlink communication in the initial connection procedure, the base station device 1 transmits a predetermined signal with a specific time resource. After transmitting the predetermined signal, the base station device 1 transmits a signal with a second signal waveform in downlink communication in the initial connection procedure. In the description of this paragraph, the first signal waveform and the second signal waveform may be reversed.

When transmitting a predetermined signal using a time resource other than a specific time resource (for example, a symbol), the base station device 1 performs downlink communication in the initial connection procedure using the second signal waveform. In other words, when using the second signal waveform in downlink communication in the initial connection procedure, the base station device 1 transmits the predetermined signal using a time resource other than the specific time resource. After transmitting the predetermined signal, the base station device 1 transmits a signal with a second signal waveform in downlink communication in the initial connection procedure. The predetermined signal itself is transmitted with an arbitrary signal waveform or a predetermined signal waveform. In the description of this paragraph, the first signal waveform and the second signal waveform may be reversed.

The terminal device 2 controls reception processing used in downlink communication in the initial connection procedure, according to the time resource (for example, symbol) in which the predetermined signal is received. For example, if the time resource in which the predetermined signal is received is a specific time resource, the terminal device 2 uses the reception processing for the first signal waveform to receive downlink communication in the initial connection procedure. If the time resource in which the predetermined signal is received is not a specific time resource, the terminal device 2 receives the downlink communication in the initial connection procedure using the reception processing for the second signal waveform. Note that the symbol is specified by a symbol index. In the description of this paragraph, the first signal waveform and the second signal waveform may be reversed.

Information regarding the time resources in which a predetermined signal is received may be notified from the base station device 1 to the terminal device 2 before transmitting the predetermined signal or in a state of being included in the predetermined signal, or such notification may be unnecessary. In this case, the terminal device 2 may detect the time resource in which the predetermined signal was received from the received predetermined signal. In this case, the base station device 1 does not need to explicitly transmit information regarding the time resources for transmitting the predetermined signal.

As another example, the base station device 1 controls the signal waveform to be used in the initial connection procedure according to the number of time resources (for example, the number of symbols) for transmitting a predetermined signal. For example, when the number of symbols for transmitting a predetermined signal is a predetermined number, the base station device 1 performs downlink communication in the initial connection procedure using the first signal waveform. In other words, when using the first signal waveform in downlink communication in the initial connection procedure, the base station device 1 transmits a predetermined signal with a predetermined number of symbols. After transmitting the predetermined signal, the base station device 1 uses the first signal waveform in downlink communication in the initial connection procedure. If the number of symbols for transmitting a predetermined signal is not the predetermined number, the base station device 1 performs downlink communication in the initial connection procedure using the second signal waveform. In other words, when using the second signal waveform in downlink communication in the initial connection procedure, the base station device 1 transmits a predetermined signal with a number of symbols other than the predetermined number. After transmitting the predetermined signal, the base station device 1 uses the second signal waveform in downlink communication in the initial connection procedure. The predetermined signal itself is transmitted with an arbitrary signal waveform or a predetermined signal waveform. In the description of this paragraph, the first signal waveform and the second signal waveform may be reversed.

The terminal device 2 controls reception processing used in downlink communication in the initial connection procedure according to the number of symbols in which a predetermined signal is received. For example, if the number of symbols in which a predetermined signal is received is a predetermined value, the terminal device 2 uses the reception processing for the first signal waveform to receive downlink communication in the initial connection procedure. If the number of symbols in which the predetermined signal is received is not the predetermined number, reception processing for the second signal waveform is used to receive downlink communication in the initial connection procedure. Note that the symbol is specified by a symbol index. In the description of this paragraph, the first signal waveform and the second signal waveform may be reversed.

Information regarding the number of symbols for transmitting a predetermined signal may be notified from the base station device 1 to the terminal device 2 before transmitting the predetermined signal or in a state of being included in the predetermined signal, or such notification may be unnecessary. In this case, the terminal device 2 may detect the number of symbols in which a predetermined signal is received from the received predetermined signal. In this case, the base station device 1 does not need to explicitly transmit information regarding the number of symbols in which a predetermined signal is transmitted.

In the initial connection procedure and any subsequent time segment, the base station device 1 may control the signal waveform to be used according to the time resources (for example, symbols) or the number of symbols used each time downlink communication is performed. The terminal device 2 may control reception processing applied to the signal received from the base station device 1 according to the time resources (symbols) or the number of symbols of the received signal. Accordingly, the base station device 1 and the terminal device 2 can selectively switch the signal waveform to be used and reception processing each time downlink communication is performed.

[4] Information Regarding Non Orthogonal Resources in which Predetermined Signal is Transmitted Non-orthogonal resources are resources that may cause interference even if they are different, and include multi-access resources (MA), multi-access physical resources (MA), and the like.

The base station device 1 controls signal waveforms used in downlink communication in the initial connection procedure, depending on non-orthogonal resources that transmit predetermined signals. For example, when transmitting a predetermined signal using a predetermined multi-access physical resource, the base station device 1 uses the first signal waveform in downlink communication in the initial connection procedure. In other words, when using the first signal waveform in downlink communication in the initial connection procedure, the base station device 1 transmits a predetermined signal using a predetermined multi-access physical resource. When transmitting a predetermined signal using a multi-access physical resource other than the pre-determined multi-access physical resource, the base station device 1 uses the second signal waveform in downlink communication in the initial connection procedure. In other words, when using the second signal waveform in downlink communication in the initial connection procedure, the base station device 1 transmits the predetermined signal using a multi-access physical resource other than the predetermined multi-access physical resource. In the description of this paragraph, the first signal waveform and the second signal waveform may be reversed.

In the initial connection procedure, the terminal device 2 controls the reception processing to be used according to the non-orthogonal resources including a predetermined signal received from the base station device 1. For example, if the multi-access physical resource that received the predeter-mined signal is the predetermined multi-access physical resource, the terminal device 2 uses the reception processing for the first signal waveform to receive the downlink of the initial connection procedure. If the multi-access physical resource in which the predetermined signal has been received is not the predetermined multi-access physical resource, downlink reception of the initial connection pro-cedure is performed using the reception processing for the second signal waveform. In the description of this para-graph, the first signal waveform and the second signal waveform may be reversed.

Information regarding the non-orthogonal resource in which a predetermined signal is transmitted may be notified from the base station device 1 to the terminal device 2 before transmitting the predetermined signal or in a state of being included in the predetermined signal, or such notification may be unnecessary. In this case, the terminal device 2 may determine from the received predetermined signal whether the non-orthogonal resource to which the predetermined signal was transmitted corresponds to the predetermined multi-access physical resource. In this case, the base station device 1 does not need to explicitly transmit information regarding the non-orthogonal resource on which the prede-termined signal is transmitted.

In the initial connection procedure or an arbitrary time segment thereafter, the base station device 1 may selectively switch the signal waveform to be used depending on the non-orthogonal resources to be used each time downlink communication is performed. The terminal device 2 may switch the reception processing applied to the signal received from the base station device 1 according to the non-orthogonal resources of the received signal. Accord-ingly, the base station device 1 and the terminal device 2 can selectively switch the signal waveform to be used and reception processing each time downlink communication is performed.

[5] Information Regarding Number of Transmission Layers in Downlink

The base station device 1 controls the signal waveform used for downlink signal transmission according to the number of transmission layers. For example, when trans-mitting a predetermined signal using the maximum number of transmission layers or two or more transmission layers, the base station device 1 uses the first signal waveform in downlink communication in the initial connection proce-dure. When transmitting a predetermined signal using one transmission layer, the base station device 1 uses the second signal waveform in downlink communication in the initial connection procedure.

The terminal device 2 controls reception processing used for downlink communication in the initial connection pro-cedure according to the number of transmission layers of a predetermined signal received from the base station device 1. For example, if the number of layers on which a prede-termined signal is received is the maximum number of transmission layers or two or more layers, the terminal device 2 receives downlink communication using the recep-tion processing for the first signal waveform in the initial connection procedure. If the number of layers in which the predetermined signal is received is 1, the terminal device 2 receives downlink communication using the reception pro-cessing for the second signal waveform in the initial con-nection procedure. In the description of this paragraph, the first signal waveform and the second signal waveform may be reversed.

Information regarding the number of transmission layers in which a predetermined signal is transmitted may be notified from the base station device 1 to the terminal device 2 before transmitting the predetermined signal or in a state of being included in the predetermined signal, or such notification may be unnecessary. In this case, the terminal device 2 may determine the number of transmission layers in which the predetermined signal has been transmitted from the received predetermined signal. In this case, the base station device 1 does not need to explicitly transmit infor-mation regarding the number of transmission layers in which a predetermined signal is transmitted. A predetermined sig-nal implicitly includes information on the number of trans-mission layers.

During the initial connection procedure or an arbitrary time segment thereafter, the base station device 1 may switch the signal waveform used for transmitting the signal, according to the number of transmission layers for trans-mitting the signal. The terminal device 2 may switch the reception processing applied to the signal received from the base station device 1 according to the number of transmis-sion layers of the received signal. Accordingly, the base station device 1 and the terminal device 2 can selectively switch the signal waveform to be used and reception pro-cessing each time downlink communication is performed.

[6] Information Regarding Number of Symbols Included in Slot

The base station device 1 controls the signal waveform to be used in downlink communication according to the num-ber of symbols included in a slot. For example, when the number of symbols included in a slot for transmitting a predetermined signal is predetermined (for example, 14), the base station device 1 uses the first signal waveform in downlink communication in the initial connection proce-dure. If the number of symbols included in the slot is different from the predetermined number, the base station device 1 uses the second signal waveform in downlink communication in the initial connection procedure. In the description of this paragraph, the first signal waveform and the second signal waveform may be reversed.

The terminal device 2 controls the reception processing to be used according to the number of symbols included in the downlink slot. For example, if the number of symbols included in a downlink slot in which a predetermined signal is transmitted is predetermined (for example, 14), the ter-minal device 2 receives downlink communication using the reception processing for the first signal waveform in the initial connection procedure. If the number of symbols included in the downlink slot is different from the predetermined number, the terminal device 2 receives the downlink communication using the reception processing for the second signal waveform in the initial connection procedure. In the description of this paragraph, the first signal waveform and the second signal waveform may be reversed.

Information regarding the number of symbols included in a slot in which a predetermined signal is transmitted may be notified from the base station device 1 to the terminal device 2 before transmitting the predetermined signal or in a state of being included in the predetermined signal, or such notification may be unnecessary. In this case, the terminal device 2 may detect the number of symbols included in the slot from the received predetermined signal. In this case, the base station device 1 does not need to transmit information regarding the number of symbols included in the slot in which a predetermined signal is transmitted.

During the initial connection procedure or an arbitrary time segment thereafter, the base station device 1 may switch the signal waveform used for transmitting the signal according to the number of symbols included in the slot for transmitting the signal. The terminal device 2 may switch the reception processing to be used for each downlink slot according to the number of symbols included in the slot. Accordingly, the base station device 1 and the terminal device 2 can selectively switch the signal waveform to be used and reception processing each time downlink communication is performed.

[7] Information Regarding Subcarrier Spacing

The base station device 1 controls the signal waveform to be used in downlink communication according to the subcarrier spacing to be used. For example, when the subcarrier spacing for transmitting a predetermined signal is equal to or greater than a predetermined value, the base station device 1 uses the first signal waveform in downlink communication in the initial connection procedure. When the subcarrier spacing for transmitting a predetermined signal is less than the predetermined value, the base station device 1 uses the second signal waveform in downlink communication in the initial connection procedure. In the description of this paragraph, the first signal waveform and the second signal waveform may be reversed.

The terminal device 2 controls the reception processing to be used in the initial connection procedure according to the subcarrier spacing of the signal received from the base station device 1. For example, if the subcarrier spacing of a predetermined signal received from the base station device 1 is equal to or greater than a predetermined value, the terminal device 2 receives downlink communication using the reception processing for the first signal waveform in the initial connection procedure. If the subcarrier spacing of the predetermined signal received from the base station device 1 is less than the predetermined value, the terminal device 2 receives downlink communication using the reception processing for the second signal waveform in the initial connection procedure. In the description of this paragraph, the first signal waveform and the second signal waveform may be reversed.

Information regarding the subcarrier spacing in which a predetermined signal is transmitted may be notified from the base station device 1 to the terminal device 2 before transmitting the predetermined signal or in a state of being included in the predetermined signal, or such notification may be unnecessary. In this case, the terminal device 2 may detect the subcarrier spacing from the received predetermined signal. In this case, the base station device 1 does not need to transmit information regarding the subcarrier spacing in which a predetermined signal is transmitted.

During the initial connection procedure or an arbitrary time segment thereafter, the base station device 1 may switch the signal waveform used for transmitting the signal according to the subcarrier spacing for transmitting the signal. The terminal device 2 may switch reception processing for the received signal according to the subcarrier spacing of the received signal. Accordingly, the base station device 1 and the terminal device 2 can selectively switch the signal waveform to be used and reception processing each time downlink communication is performed.

[8] Information Regarding Communication Channels Used in Downlink Communication

The base station device 1 controls the signal waveform to be used in downlink communication according to the communication channel in which the signal is transmitted. For example, when transmitting a predetermined signal on the PBCH, the base station device 1 uses the second signal waveform in downlink communication in the initial connection procedure. When transmitting a predetermined signal using a communication channel other than PBCH, the base station device 1 uses the first signal waveform in downlink communication in the initial connection procedure. A second signal waveform may be used instead of the first signal waveform. In the description of this paragraph, the first signal waveform and the second signal waveform may be reversed.

In the initial connection procedure, the terminal device 2 controls the reception processing to be used according to the communication channel for receiving the signal from the base station device 1. For example, when receiving a predetermined signal on the PBCH, the terminal device 2 receives downlink communication using the reception processing for the second signal waveform in the initial connection procedure. When receiving a predetermined signal on a communication channel other than PBCH, the terminal device 2 receives downlink communication using the reception processing for the first signal waveform in the initial connection procedure. When receiving on a communication channel other than PBCH, reception processing for the second signal waveform may be used instead of reception processing for the first signal waveform. In the description of this paragraph, the first signal waveform and the second signal waveform may be reversed.

During the initial connection procedure or an arbitrary time segment thereafter, the base station device 1 may switch the signal waveform to be used according to the communication channel in which the signal is transmitted. For example, when transmitting a signal on PBCH, the base station device 1 uses the second signal waveform for transmitting the signal. When transmitting a signal on a communication channel other than PBCH, the base station device 1 uses the first signal waveform (or second signal waveform). The terminal device 2 may switch the reception processing to be used according to the communication channel in which the signal is received. For example, when the terminal device 2 receives a signal on the PBCH, the terminal device 2 receives the signal using the reception processing for the second signal waveform. When the terminal device 2 receives the signal on a communication channel other than the PBCH, the terminal device 2 receives the signal using the reception processing for the first signal waveform. Accordingly, the base station device 1 and the terminal device 2 can selectively switch the signal waveform to be used and reception processing each time downlink communication is performed.

[9] Information Regarding Modulation Methods Used in Downlink Communication

The base station device 1 controls the signal waveform to be used in downlink communication in the initial connection procedure according to the modulation method to be used. For example, when transmitting a predetermined signal using a modulation method with a modulation level of 16QAM or more (higher-order modulation method), the base station device 1 uses the first signal waveform in downlink communication in the initial connection procedure. When transmitting a predetermined signal using a modulation method (lower-order modulation method) with a modulation level less than 16QAM, the base station device 1 uses the second signal waveform in downlink communication in the initial connection procedure. Examples of lower-order modulation methods include BPSK and QPSK. In this description, it is assumed that the same modulation method is applied to a signal transmitted after a predetermined signal in the initial connection procedure. In the description of this paragraph, the first signal waveform and the second signal waveform may be reversed.

The terminal device 2 controls the reception processing to be used in the initial connection procedure according to the modulation method applied to the signal received from the base station device 1. For example, if a modulation method (higher-order modulation method) with a modulation level of 16QAM or more is applied to a predetermined signal received from the base station device 1, the terminal device 2 receives downlink communication using the reception processing for the first signal waveform in the initial connection procedure. If a modulation method (lower-order modulation method) with a modulation level less than 16QAM is applied to the predetermined signal received from the base station device 1, the terminal device 2 receives downlink communication using the reception processing for the second signal waveform in the initial connection procedure. In the description of this paragraph, the first signal waveform and the second signal waveform may be reversed.

Information regarding the modulation method applied to a predetermined signal may be notified from the base station device 1 to the terminal device 2 before transmitting the predetermined signal or in a state of being included in the predetermined signal, or such notification may be unnecessary. In this case, the terminal device 2 may detect modulation method information from the received predetermined signal.

During the initial connection procedure or an arbitrary time segment thereafter, the base station device 1 may switch the signal waveform used for transmitting the signal, according to the modulation method applied to the signal. The terminal device 2 may switch the reception processing used for the received signal according to the modulation method applied to the received signal. Accordingly, the base station device 1 and the terminal device 2 can selectively switch the signal waveform to be used and reception processing each time downlink communication is performed.

[10] Information Regarding Frequency Bands Used in Downlink Communication

The base station device 1 controls the signal waveform to be used in downlink communication according to the frequency band used. For example, when transmitting a predetermined signal using a band of 52.6 GHz or more, the base station device 1 uses the first signal waveform in downlink communication in the initial connection procedure. When transmitting a predetermined signal using a band less than 52.6 GHz, the base station device 1 uses the second signal waveform in downlink communication in the initial connection procedure. In the description of this paragraph, the first signal waveform and the second signal waveform may be reversed.

In the initial connection procedure, the terminal device 2 controls reception processing used for the received signal according to the frequency band of the received signal. For example, when the terminal device 2 receives a predetermined signal in the downlink from the base station device 1 in a band of 52.6 GHz or more, the terminal device 2 receives downlink communication using the reception processing for the first signal waveform in the initial connection procedure. If a predetermined signal is received in the band below 52.6 GHz in the downlink from the base station device 1, the terminal device 2 receives downlink communication using the reception processing for the second signal waveform in the initial connection procedure. In the description of this paragraph, the first signal waveform and the second signal waveform may be reversed.

Information regarding the frequency band included in the slot in which a predetermined signal is transmitted may be notified from the base station device 1 to the terminal device 2 before transmitting the predetermined signal or in a state of being included in the predetermined signal, or such notification may be unnecessary. In this case, the terminal device 2 may detect the reception frequency band from the received predetermined signal. In this case, the base station device 1 does not need to explicitly transmit information regarding the frequency band in which the predetermined signal is transmitted.

During the initial connection procedure or an arbitrary time segment thereafter, the base station device 1 may switch the signal waveform used for transmitting the signal, according to the frequency band used for transmitting the signal. The terminal device 2 may switch the reception processing used for the received signal according to the frequency band in which the signal is received. Accordingly, the base station device 1 and the terminal device 2 can selectively switch the signal waveform to be used and reception processing each time downlink communication is performed.

[11] Information Regarding CP (Cyclic Prefix) Length Used in Downlink Communication The base station device 1 controls the signal waveform to be used in downlink communication according to the CP length to be used. For example, when transmitting a predetermined signal using a CP length greater than or equal to a predetermined value, the base station device 1 uses the first signal waveform in downlink communication in the initial connection procedure. When transmitting a predetermined signal using a CP length less than a predetermined value, the base station device 1 uses the second signal waveform in downlink communication in the initial connection procedure. In this description, it is assumed that the same CP length is used in the initial connection procedure after transmitting a predetermined signal. In the description of this paragraph, the first signal waveform and the second signal waveform may be reversed.

In the initial connection procedure, the terminal device 2 controls the reception processing used for the received signal according to the CP length of the received signal. For example, if the CP length of a predetermined signal received on the downlink from the base station device 1 is equal to or greater than a predetermined value, the terminal device 2 receives downlink communication using the reception processing for the first signal waveform in the initial connection procedure. If the CP length of the predetermined signal received in the downlink from the base station device 1 is less than the predetermined value, the terminal device 2 receives the downlink communication using the reception processing for the second signal waveform in the initial connection procedure. In the description of this paragraph, the first signal waveform and the second signal waveform may be reversed.

During the initial connection procedure or an arbitrary time segment thereafter, the base station device 1 may switch the signal waveform used for transmitting the signal, according to the CP length used for transmitting the signal. The terminal device 2 may switch the reception processing used for the received signal according to the CP length of the received signal. Accordingly, the base station device 1 and the terminal device 2 can selectively switch the signal waveform to be used and reception processing each time downlink communication is performed.

[12] Information Regarding DCI Format

The base station device 1 controls signal waveforms used in downlink communication according to the DCI format. For example, when Format A is used as the DCI format, the base station device 1 uses the first signal waveform in the downlink communication in the initial connection procedure or in another time segment. When Format B is used as the DCI format, the base station device 1 uses the second signal waveform in the downlink communication in the initial connection procedure or in another time segment. In the description of this paragraph, the first signal waveform and the second signal waveform may be reversed.

The terminal device 2 specifies the format of the DCI received from the base station device 1, and if the format is A, performs reception processing for the first signal waveform in the initial connection procedure or in another time segment. If the format of the DCI received from the base station device 1 is Format B, the terminal device 2 performs reception processing for the second signal waveform in the initial connection procedure or in another time segment. In the description of this paragraph, the first signal waveform and the second signal waveform may be reversed.

[13] Explicit Information Regarding Signal Waveforms Used in Downlink Communication Information indicating that the first signal waveform is used (information A) and information indicating that the second signal waveform is used (information B) are defined. The base station device 1 transmits a signal including information A when using the first signal waveform as the signal waveform to be used. After this, in downlink communication, a signal may be transmitted using the first signal waveform without including information A. The base station device 1 transmits a signal including information B when using the second signal waveform as the signal waveform to be used. After this, in downlink communication, a signal may be transmitted using the second signal waveform without including information B.

When information A is included in the signal received from the base station device 1, the terminal device 2 uses the reception processing for the first signal waveform for the received signal. Alternatively, the terminal device 2 may continue to use the reception processing for the first signal waveform for signals received on the downlink thereafter. When information B is included in the signal received from the base station device 1, the terminal device 2 uses the reception processing for the second signal waveform for the received signal. Alternatively, the terminal device 2 may continue to use the reception processing for the second signal waveform for the signal received on the downlink thereafter.

[14] Information on Whether Predetermined Signal is being Transmitted

Whether a predetermined signal is being transmitted (whether a predetermined signal is transmitted) itself functions as signal waveform identification information. That is, the predetermined signal itself specifies which of the first signal waveform and the second signal waveform is used. For example, when a certain synchronization signal (referred to as synchronization signal A) means that a second signal waveform is used, the base station device 1 transmits the synchronization signal A to notify the terminal device 2 that the second signal waveform will be used in the initial connection procedure or another time segment. In this case, after transmitting the synchronization signal A, the base station device 1 uses the second signal waveform in downlink communication in the initial connection procedure or in another time segment. The terminal device 2 performs reception processing for the first signal waveform until it receives the synchronization signal A, and when it receives the synchronization signal A, switches the reception processing to the reception processing for the second signal waveform. In this example, an example is shown in which the first signal waveform is switched to the second signal waveform. However, when switching the second signal waveform to the first signal waveform, similar processing can be executed by defining the predetermined signal to mean that the first signal waveform is to be used.

<Signal Waveform Switching Notification>

It is assumed that the default signal waveform is determined to be either the first signal waveform or the second signal waveform. When the base station device 1 switches the signal waveform to be used in downlink communication from the default signal waveform (one signal waveform) to the other signal waveform, the base station device 1 notifies the terminal device 1 of information (second information) regarding switching of the signal waveform to be used. Even when switching the signal waveform to be used from another signal waveform to the default signal waveform, the base station device 1 notifies the terminal device 1 of information (second information) regarding the switching of the signal waveform to be used.

For example, if the default signal waveform is a multi-carrier signal and the base station device 1 determines that it is necessary to switch the signal waveform to be used to a single-carrier signal, the base station device 1 notifies information indicating the switching (second information). After switching the signal waveform to be used to a single-carrier signal, when switching to a multi-carrier signal again, the base station device transmits information indicating the switching again. The switching information transmitted first and the switching information transmitted later may be the same information or different information. As the switching information, the signal waveform identification information according to any of the examples [1] to [14] described above may be used. The switching information may be 1 bit.

As an operation on the receiving side, the terminal device 2 first performs reception processing for a default signal waveform (here, a multi-carrier signal) on the signal received from the base station device 1. Thereafter, when the terminal device 2 receives the signal waveform identification information from the base station device 1, the terminal device 2 switches the reception processing from the reception processing for multi-carrier signals to the reception processing for single-carrier signals. Furthermore, after that, when the terminal device 2 receives the signal waveform identification information from the base station device 1, the terminal device 2 switches the reception processing again from the reception processing for single-carrier signals to the reception processing for multi-carrier signals.

<Example of Switching Signal Waveform to be Used According to Communication Processing to be Executed>

The base station device 1 controls signal waveforms to be used in downlink communication according to communication processing to be executed. For example, the base station device 1 uses a default signal waveform, that is, one of the first signal waveform and the second signal waveform, as the signal waveform in downlink communication in predetermined processing (first processing). In processing other than the predetermined processing (second processing), the signal waveform to be used is switched to the other of the first signal waveform and the second signal waveform. As an example, the second signal waveform is a signal to which transform precoding is applied (for example, a DFT-Spread-OFDM signal), and the first signal waveform is a signal to which transform precoding is not applied (for example, an OFDM signal).

The terminal device 2 switches the reception processing to be used according to the communication processing to be executed. When the terminal device 2 performs the first processing with the base station device 1, the terminal device 2 sets reception processing for the default signal waveform. When the terminal device 2 performs the second processing with the base station device 1, the terminal device 2 sets reception processing for the other signal waveform. Specifically, the signal waveform switch 301 of the terminal device 2 provides the signal received on the downlink from the base station device 1 to one of the first signal waveform receiver 303 and the second signal waveform receiver 305 according to the communication processing to be executed. In the case of the first processing, the signal received on the downlink from the base station device 1 is provided to the signal waveform receiver corresponding to the default signal waveform. In the case of the second processing, the signal received on the downlink from the base station device 1 is provided to the other signal waveform receiver. The terminal device 2 may autonomously detect information regarding the communication processing to be executed without being notified from the base station device 1.

An example of the predetermined processing will be shown below.

Synchronization signal transmission/reception processing (transmission/reception processing of synchronization signals such as PSS, SSS, TSS)

Random access transmission/reception processing (message 2 transmission/reception processing, message 4 transmission/reception processing, message B transmission/reception processing)

Control signal transmission/reception processing (for example, PDCCH transmission/reception processing)

Reference signal transmission/reception processing

<Example of Determining Application Timing or Application Period of Signal Waveform>

The base station device 1 may set a start timing and/or an application period for applying any signal waveform (target signal waveform).

For example, when switching the signal waveform to be used from a first signal waveform to a second signal waveform, the base station device 1 sets the start timing and/or application period for applying the second signal waveform (target signal waveform). The base station device 1 notifies the terminal device 2 of information regarding the start timing of applying the second signal waveform (third information) and/or information regarding the application period (fourth information).

An example of the information indicating the start timing (third information) is information for specifying a slot (application start slot) in which application of the target signal waveform is started. The information may be information specifying a slot (for example, the immediately previous slot) a predetermined number of times before the application start slot, or information specifying the application start slot. In the former case, the second signal waveform is used from a slot a predetermined number of times after the designated slot. In the latter case, the second signal waveform is used from the designated slot. In the base station device 1 and/or the terminal device 2, the start timing of the second signal waveform may be managed by an arbitrary method. For example, the start timing may be managed by a timer or by a time (absolute time) corresponding to the start timing. Alternatively, the start timing may be managed by the number of time units (number of symbols, number of slots, and the like) until the start timing.

The information (fourth information) for specifying the application period of the second signal waveform (target signal waveform) may be the time length in which the second signal waveform is applied, or may be the end time indicating the end of the application period, or may be the number of time units such as the number of symbols or the number of slots. The application period is managed in the base station device 1 and/or the terminal device 2 in an arbitrary manner depending on each type of information. For example, the application period may be managed by a timer, an end time, or a number of time units (number of symbols, number of slots, and the like).

The base station device 1 uses the second signal waveform (target signal waveform) in downlink communication during the application period of the second signal waveform (target signal waveform). When the application period has elapsed, the base station device 1 switches the signal waveform to be used in downlink communication to the first signal waveform.

The application period or the length of the application period of the target signal waveform may be statically determined based on specifications or the like. Alternatively, the base station device 1 may semi-statically set the application period or the length of the application period of the target signal waveform using SI (System Information) or RRC signaling. Alternatively, the application period or the length of the application period of the target signal waveform may be dynamically set using MAC CE or DCI.

In addition, the setting of the application period or the length of the application period of the target signal waveform may be performed for each of multiple signal waveforms if each can be the target signal waveform. If only one of them can be the target signal waveform, it may be set only for that one signal waveform.

When temporarily switching from the default signal waveform to another signal waveform (target signal waveform), the base station device 1 may set the start timing and/or application period of the target signal waveform.

<Handover>

When a terminal device performs a handover, the source base station device may transmit information regarding a signal waveform used by the target base station device to the terminal device in advance. In order to transmit information regarding the signal waveform, the source base station device can use a handover command such as RRC reconfiguration. The terminal device performs an initial connection procedure with the target base station device (cell) based on the information received from the source base station device. The target base station device may notify the source base station device of information regarding the signal waveform to be used, and the source base station device may notify the terminal device of information regarding the signal waveform used by the target base station device based on the notified information. The information transmitted to the terminal device may be information regarding the signal waveform of the synchronization signal to be first received from the target base station device. Alternatively, the information transmitted to the terminal device may be information regarding the signal waveform of a specific signal (for example, a signal on a specific channel) transmitted from the target base station device. In this case, the target base station device may omit the processing of transmitting signal waveform identification information of a signal waveform used for a specific signal to the terminal device.

<Selective Use of Signal Waveforms According to Area>

The base station device 1 may control the signal waveform to be used in downlink communication with the terminal device 2 depending on whether the terminal device 2 is located in an edge area of a cell provided by the base station device 1 or an area other than the cell edge area. For example, a single-carrier signal is considered to be more suitable than a multi-carrier signal in a cell edge area where it requires transmission with higher power than areas other than the edge area. Therefore, the base station device 1 may use, for example, a single-carrier signal for a cell edge area, and a multi-carrier signal for areas other than the edge area.

<Selective Use of Signal Waveforms According to Elevation Angle of Satellite Relative to Terminal Device>

When the base station device 1 is a satellite, the base station device 1 may determine the signal waveform to be used in downlink communication with the terminal device 2 according to the elevation angle with respect to the terminal device 2. For example, when the elevation angle is low, transmission with higher power is required than when the elevation angle is high. For this reason, single-carrier signals are considered to be more suitable than multi-carrier signals. Therefore, the base station device 1 may determine a single-carrier signal when the elevation angle with respect to the terminal device 2 is less than a threshold, and a multi-carrier signal when it is greater than or equal to the threshold as the signal waveform to be used for the terminal device 2.

<Selective Use of Signal Waveforms According to Altitude of Satellite>

When the base station device 1 is a satellite, the base station device 1 may determine the signal waveform to be used in downlink communication with the terminal device 2 according to the altitude of the base station device 1. For example, when the satellite is at a high altitude, higher power transmission is required than when the satellite is at a lower altitude. For this reason, single-carrier signals are considered to be more suitable than multi-carrier signals. Therefore, the base station device 1 may determine a single-carrier signal when the altitude of the subject station (satellite) is equal to or greater than a threshold, and a multi-carrier signal when it is below the threshold as the signal waveform to be used for the terminal device 2. Alternatively, the signal waveform may be determined depending on whether the base station device 1 is a non-ground station such as a satellite or a terrestrial base station.

44

<Selective Use of Signal Waveforms According to Satellite Performance>

When the base station device 1 is a satellite, the base station device 1 may determine the signal waveform used for downlink communication with the terminal device 2 according to the performance or type of the subject station (satellite). For example, in the case of a satellite that cannot transmit with high power (such as a low-cost satellite), a single-carrier signal may be more suitable than a multi-carrier signal. Therefore, for example, the base station device 1 determines a single-carrier signal when the subject station is unable to transmit with high power and can transmit with low power, which is smaller than the high power, and a multi-carrier signal when its optical switch function station can transmit with high power, as the signal waveform to be used for the terminal device 2. High power is power above a threshold, and low power is power below a threshold.

<Other Selective Use of Signal Waveforms>

The base station device 1 performs control to measure the difference between the desired uplink reception timing and the actual reception timing for the terminal device 2, and adjusts the transmission timing of the terminal device 2 so as to shift the uplink transmission timing by the measured difference. The base station device 1 may be a device such as a satellite that may be located at a long distance from the terminal device 2. The base station device 1 transmits information regarding a transmission timing offset or timing advance to the terminal device 2 as information regarding the transmission timing of the terminal device 2. The terminal device 2 adjusts the uplink transmission timing based on the information received from the base station device 1.

If the measured difference is greater than or equal to the threshold, in other words, if the transmission timing offset or timing advance is greater than or equal to the threshold, it is considered that the base station device 1 and the terminal device 2 are located at a long distance from each other. In this case, a single-carrier signal (second signal waveform) is considered more suitable than a multi-carrier signal (first signal waveform).

Therefore, if the measured difference is greater than or equal to the threshold, in other words, if the transmission timing offset or timing advance is greater than or equal to threshold, the base station device 1 may determine a single-carrier signal as the signal waveform to be used for transmission to the terminal device 2. If the measured difference is less than the threshold, in other words, if the transmission timing offset or timing advance is less than the threshold, the base station device 1 may determine a multi-carrier signal as the signal waveform to be used for transmission to the terminal device 2. The terminal device 2 acquires information regarding transmission timing from the base station device 1. Based on the acquired information, the terminal device 2 sets reception processing for the second signal waveform if the transmission timing offset or timing advance is greater than or equal to the threshold, and sets reception processing for the first signal waveform if it is less than the threshold. In this way, the signal waveform switch 301 of the terminal device 2 determines the signal waveform receiver that provides a signal to be received from the base station device 1 from among the first signal waveform receiver 303 and the second signal waveform receiver 305 based on the acquired information. The signal waveform switch 301 of the terminal device 2 provides the signal received from the base station device 1 to the determined signal waveform receiver.

<Increase in Communication Speed or Capacity in Downlink Single-Carrier Transmission>

As described at the beginning of the description of the present embodiment, when carrying out single-carrier transmission on the uplink, it is necessary to allocate contiguous resources in the frequency domain in order to suppress an increase in PAPR.

Figure 20:
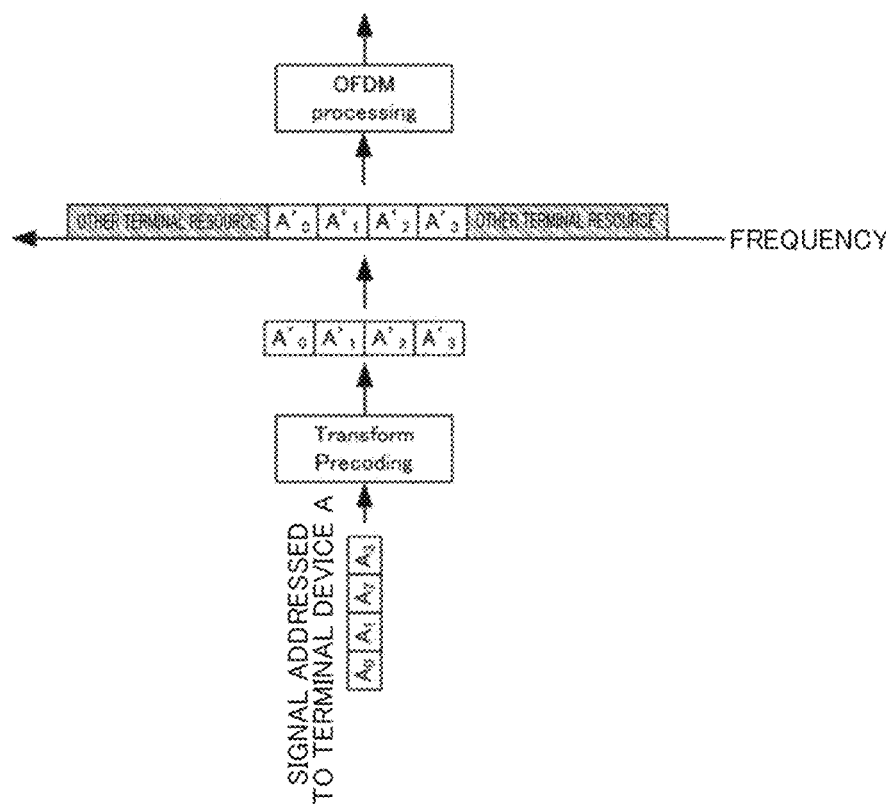
FIG. 20 is a diagram showing an example of contiguous resource allocation in the frequency domain when performing single-carrier transmission on the uplink.

FIG. 20 shows an example of contiguous resource allocation in the frequency domain when a terminal device performs single-carrier transmission (transmits a single-carrier signal) on the uplink. Transform precoding (IDFT or FFT, and the like) is performed on the uplink signal (signals $A_0$ to $A_3$ in the figure) of the terminal device (terminal device A in the figure), and the precoded signals $A'_0$ to $A'_3$ are allocated to contiguous resources in the frequency domain. Bands other than the allocated resources are uplink bands for other terminal devices. Terminal device A performs OFDM processing (IDFT, IFFT, and the like) on signals $A'_0$ to $A'_3$ allocated to resources, and generates a single-carrier signal.

Figure 21:
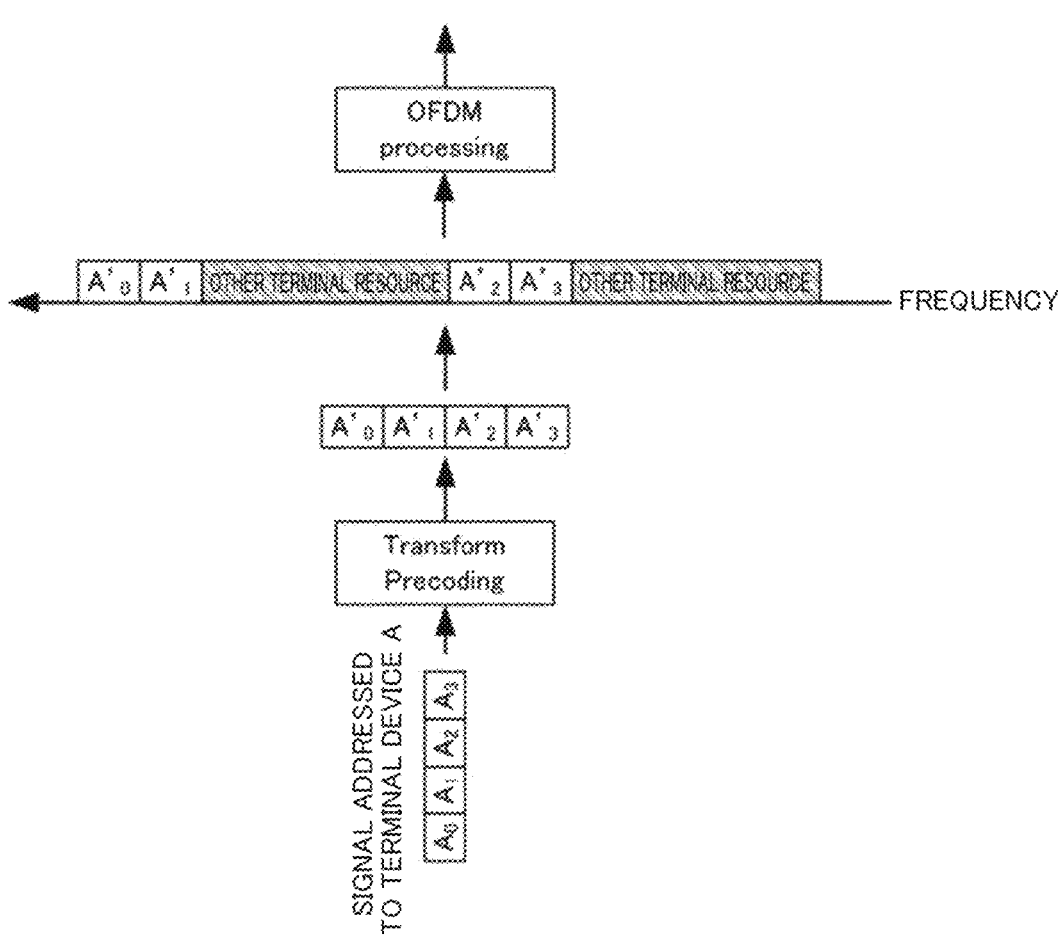
FIG. 21 is a diagram showing an example of discontiguous resource allocation in the frequency domain when performing single-carrier transmission on the uplink.

FIG. 21 shows an example of discontiguous resource allocation in the frequency domain when terminal device A performs single-carrier transmission on the uplink. Terminal device A allocates precoded signals $A'_0$ to $A'_3$ to discontiguous resources in the frequency domain. In this case, there is a problem that PAPR increases.

The present embodiment proposes a method for suppressing an increase in PAPR even if signals addressed to a terminal device are allocated to discontiguous resources in the frequency domain when the base station device 1 performs single-carrier transmission in downlink communication. A specific example of this method is shown below.

Figure 22:
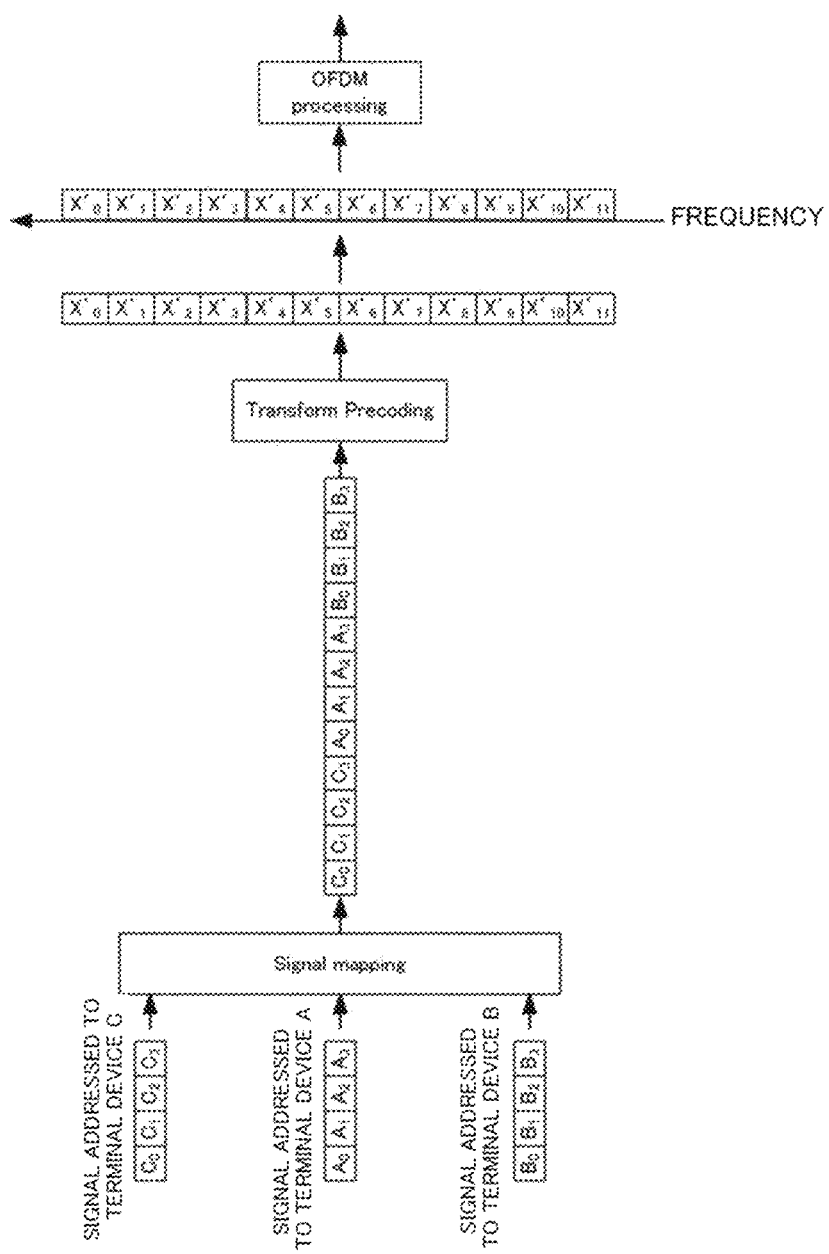
FIG. 22 is a diagram showing a configuration example of a second signal waveform transmitter in the base station device.

FIG. 22 shows a configuration example of the second signal waveform transmitter in the radio transmitter of the base station device 1.

Processing to combine signals ($A_0$ to $A_3$) addressed to terminal device A, signals addressed ($B_0$ to $B_3$) to terminal device B, and signals ($C_0$ to $C_3$) addressed to terminal device C is performed as preprocessing for transform precoding. This processing is referred to as mapping, but the name is not limited to this. In this example, the signals are mapped in the order of $A_0$ to $A_3$, $B_0$ to $B_3$, and $C_0$ to $C_3$, but this order is just an example, and other orders may be used.

A signal sequence (combined signal) obtained by the mapping is subjected to transform precoding. The precoded signals $X'_0$ to $X'_{11}$ are allocated to contiguous resources in the frequency domain. The base station device 1 performs OFDM processing (IDFT, IFFT, and the like) on the signals $X'_0$ to $X'_{11}$ allocated to the resources, and generates a single-carrier signal. As a result, contiguous allocation of resources in the frequency domain is performed, so an increase in PAPR can be suppressed.

Each terminal device that receives a single-carrier signal may extract signals addressed to the subject terminal device from a signal sequence after transform de-precoding (including signals addressed to multiple terminal devices) based on the mapping information in the single-carrier signal reception processing. Accordingly, each terminal device can acquire a signal addressed to the subject terminal device from a single-carrier signal that includes signals addressed to a plurality of terminal devices.

The mapping information of each terminal device (information for identifying the position of the signal addressed to each terminal device in the signal sequence) may be transmitted by the base station device 1 to each terminal device in advance, or may be determined in advance based on the specifications and the like, or may be obtained by each terminal device using other methods.

Mapping information for each terminal device may be associated with resource allocation information for each terminal device. In this case, the position of the signal addressed to each terminal device in the serial signal can be determined from the allocated resources of each terminal device. The resource allocation information may represent frequency resource allocation for each terminal device in multi-carrier transmission.

Figure 23:
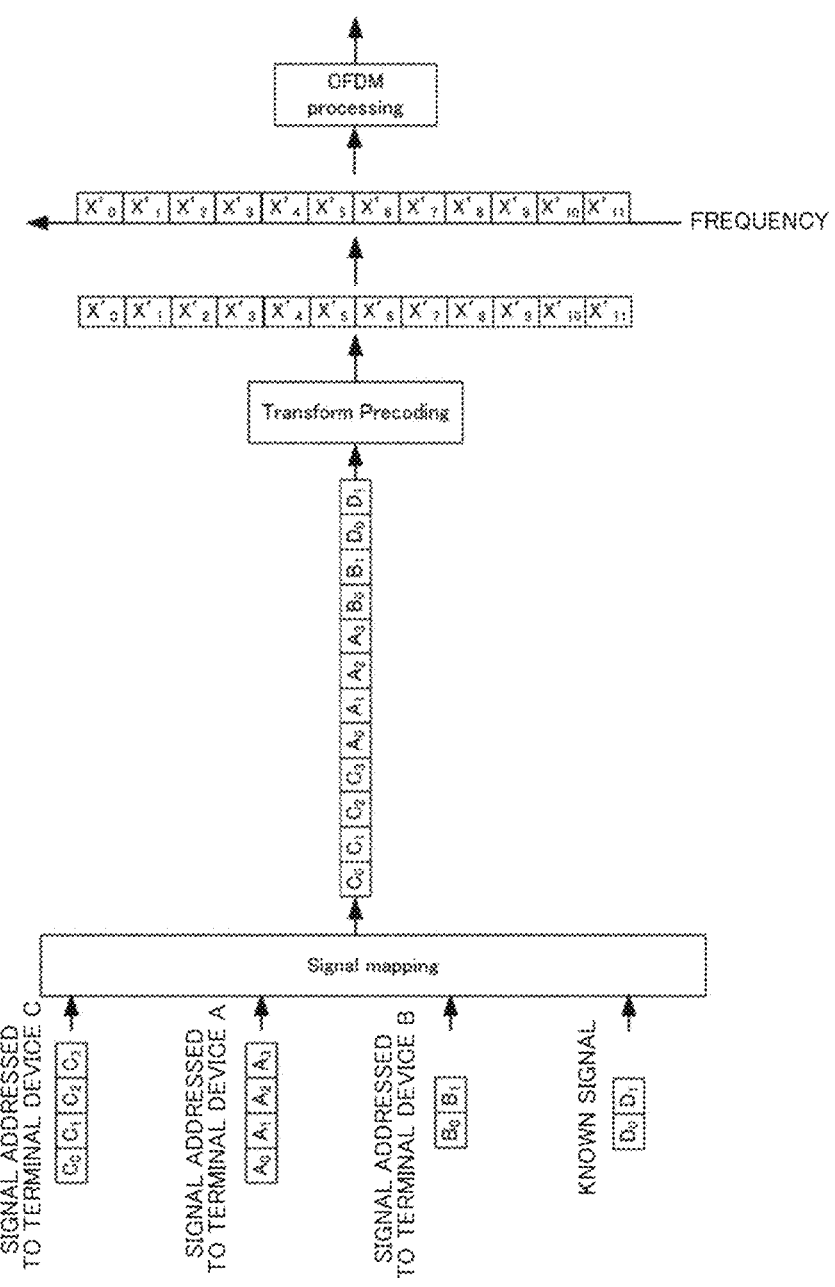
FIG. 23 is a diagram showing another configuration example of the second signal waveform transmitter in the base station device.

FIG. 23 shows another example of the configuration of the second signal waveform transmitter in the radio transmitter of the base station device 1. In addition to signals ($A_0$ to $A_3$) addressed to terminal device A, signals ($B_0$ to $B_3$) addressed to terminal device B, and signals ($C_0$ to $C_3$) addressed to terminal device C, known signals ($D_0$ to $D_1$) are also mapped. The known signal is a broadcast signal that includes information that is commonly notified to a plurality of terminal devices. The known signal may include mapping information for each terminal device. In this case, each terminal device can identify the position of the signal addressed to the subject terminal device in the signal sequence from the known signal and acquire the signal addressed to the subject terminal device. The position information of the known signal in the signal sequence may be transmitted from the base station device 1 to each terminal device in advance, may be determined in advance based on specifications and the like, or may be acquired by each terminal device using other methods.

Figure 24:
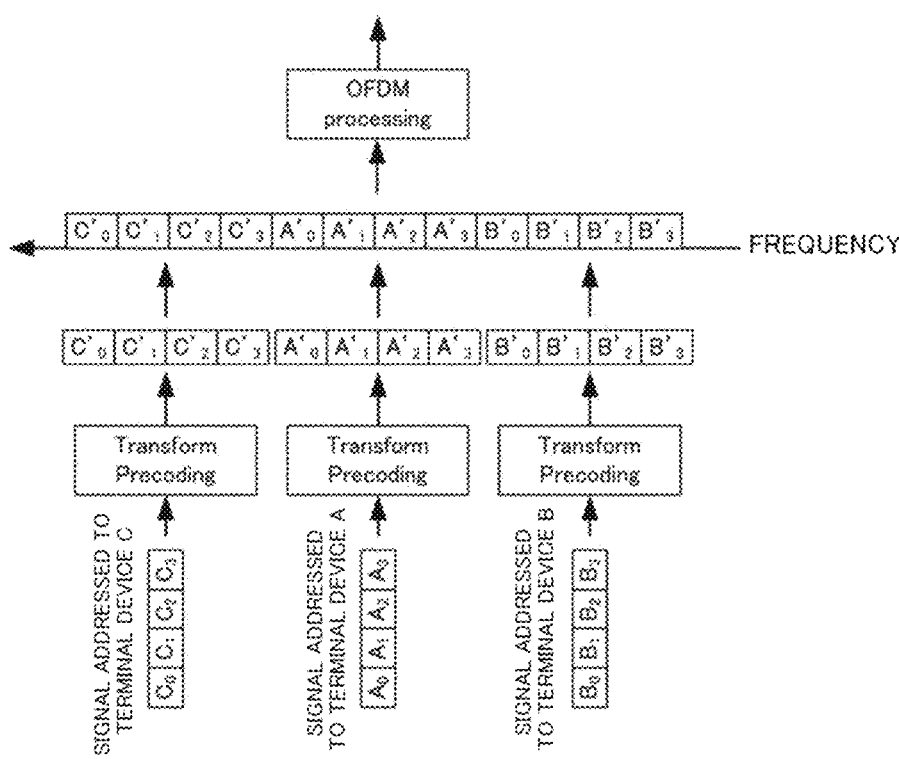
FIG. 24 is a diagram showing still another configuration example of the second signal waveform transmitter in the base station device.

FIG. 24 shows still another configuration example of the second signal waveform transmitter in the radio transmitter of the base station device 1. In the configurations shown in FIGS. 22 and 23, signals addressed to all terminal devices are transform-precoded together, but in the configuration shown in FIG. 24, signals addressed to each terminal device are transform-precoded for each terminal device. After transform precoding is performed for each terminal device, precoded signals of a plurality of terminal devices are mapped onto contiguous frequency resources. In the illustrated example, signals for terminal device A, terminal device B, and terminal device C are transform-precoded for each terminal device.

As a modification, a signal for one terminal device and each known signal may be individually transform-precoded. For example, a signal for terminal device A and a known signal are individually transform-precoded. The precoded signal of terminal device A and the precoded signal of the known signal are mapped onto contiguous frequency resources.

Figure 25:
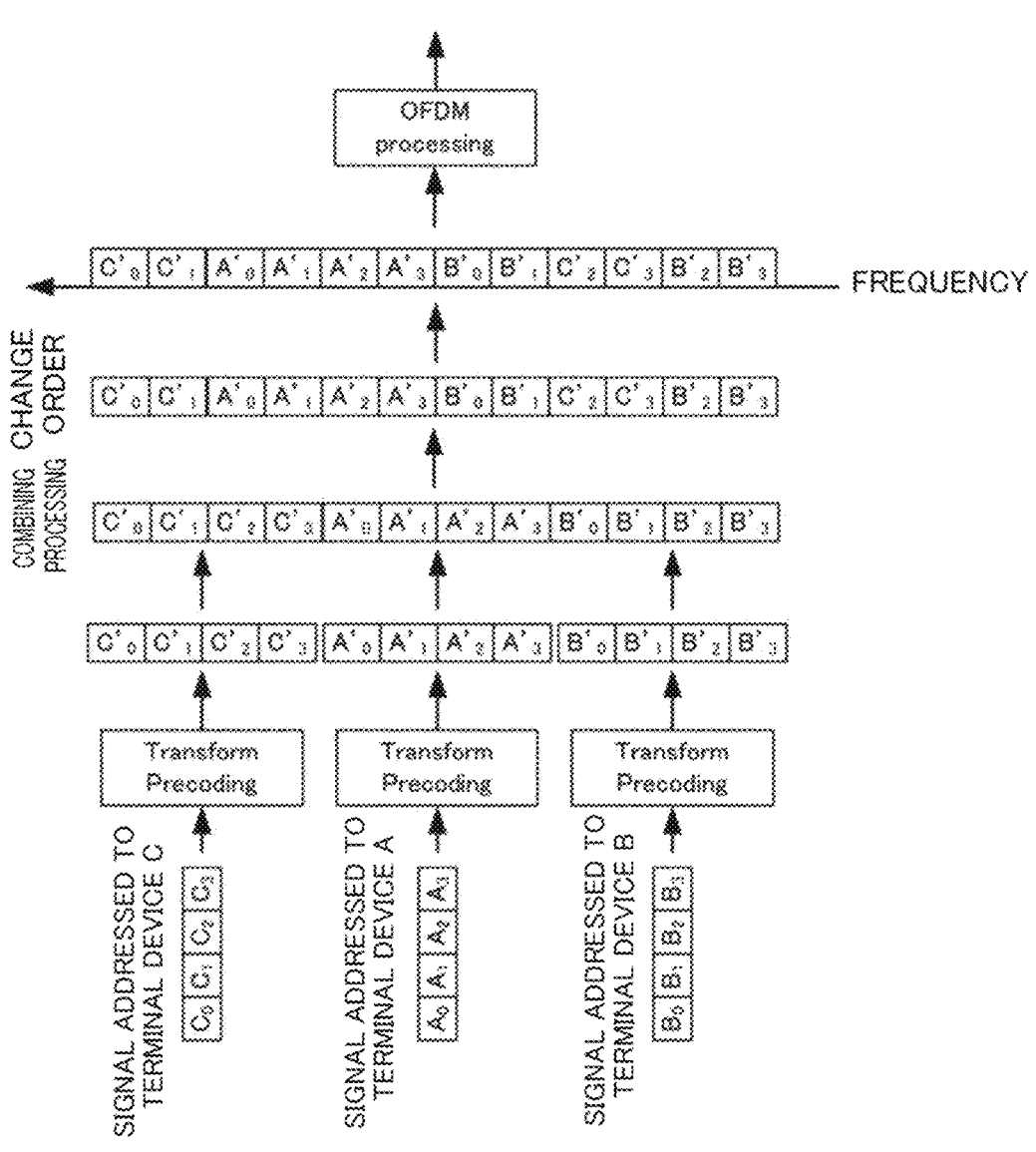
FIG. 25 is a diagram showing still another configuration example of the second signal waveform transmitter in the base station device.

FIG. 25 shows still another configuration example of the second signal waveform transmitter in the radio transmitter of the base station device 1. In FIG. 24, the precoded signals of each terminal device are mapped to contiguous frequency resources without changing the order between the terminal devices, but in the configuration of FIG. 25, the order of the precoded signals is changed between the terminal devices. Precoded signals of a plurality of terminal devices are combined, the order of the combined signals is changed, and the changed signals are mapped to contiguous frequency resources. At this time, the precoded signals of at least one terminal device among the plurality of terminal devices are mapped to non-contiguous resources in the frequency domain. The order of the signals of each terminal device may be changed depending on the channel response of each terminal device. As an example, the order of signals may be changed so that the signals of the terminal device can be allocated to frequency resources with good channel conditions for each terminal device. Specifically, for example, the order of signals may be changed so that the channel quality of each terminal device is above a certain value, or the order of signals may be changed so that the average channel quality of multiple terminal devices is above a certain value, or the order of signals may be changed based on other criteria. This processing may be included in the frequency resource mapping processing, or may be performed as separate processing. The configuration for changing the order of signals is similarly applicable to the base station device shown in FIG. 22 or 23.

In the configurations shown in FIGS. 22 to 25, it is desirable that the signal addressed to each terminal device be a signal modulated using the modulation method of the order as low as possible in order to reduce PAPR. If the modulation method of the signal addressed to terminal device A is QAM modulation with a high modulation level (for example, 16QAM), the PAPR tends to increase. PAPR can be reduced by using a lower-order modulation method with a low modulation level, such as BPSK, QPSK, or PSK, as the modulation method for all signals addressed to terminal device A, terminal device B, and terminal device C. In particular, PSK is a modulation method that does not contain information in amplitude, and a method using PSK can be considered as an example. For example, instead of 4PSK (QPSK), 16QAM, and 64QAM used in multi-carrier transmission, 4PSK, 8PSK, 16PSK, 32PSK, and the like are used in single-carrier transmission.

From the same point of view, it is desirable that the known signal shown in FIG. 23 is modulated using a lower-order modulation method such as BPSK, QPSK, or PSK. Alternatively, it is also possible to reduce PAPR by using a specific complex signal point as a known signal, such as using complex signal point (I, Q)=(+1, 0) as a known signal. Here, the complex signal points may also be referred to as complex-valued modulation symbols.

Regarding transform precoding, in the case of uplink, transform precoding (DFT) is generally performed by applying a DFT size corresponding to the frequency resources of the terminal device. On the other hand, in the present embodiment, in the case of downlink, in addition to applying the DFT size corresponding to the frequency resource of each terminal device (see FIGS. 24 and 25), execution of transform precoding (FFT) using the FFT size is also applied. That is, as shown in FIG. 22 or 23, it is possible to use FFT by transform-precoding a combination of signals of a plurality of terminal devices. In this case, there is an advantage that the base station and the terminal device do not need to perform DFT according to the size of the frequency resource. Furthermore, since information can be reflected on all frequency resources by FFT, it is possible to obtain a frequency diversity effect.

<FFT/IFFT Size and DFT/IDFT Size>

In the present embodiment, the FFT/IFFT size may represent any one of the following. Note that * represents multiplication.

Power of 2

(The size of the resource grid)*(Number of subcarriers per resource block)

In the present embodiment, the DFT/IDFT size may represent the following.

Scheduled bandwidth for uplink or downlink transmission, expressed as a number of subcarriers (Scheduled bandwidth for uplink transmission, expressed as a number of resource blocks)*(Number of subcarriers per resource block)

Size that satisfies 2a*3b*5c (a, b, c are positive integers)

<Signaling>

In the present embodiment, the following signaling information may be transmitted from the base station device to the terminal device.

Types of Transform Precoding

The base station device may transmit information that can specify the type of transform precoding to the terminal device. The terminal device specifies the type of transform precoding performed by the base station device based on the received information, and performs reception processing according to the specified type. For example, if it is specified from the received information that the size of transform precoding is FFT size, it can be determined that transform precoding is performed by the base station after combining the signals of multiple terminal devices (see FIG. 22 or 23). The terminal device performs reception processing according to the determination result. On the other hand, if the terminal device specifies from the received information that the transform precoding size is the DFT size corresponding to the frequency resource, it can be determined that transform precoding is performed by the base station device for each signal of each terminal device (see FIG. 24 or 25). The terminal device performs reception processing according to the determination result. That is, the terminal device can switch between the reception processing corresponding to the base station configuration of FIG. 22 or 23 and the reception processing corresponding to the base station configuration of FIG. 24 or 25.

Information Regarding Known Signals

The base station device may transmit complex signal point information of the known signal to the terminal device. The terminal device may decode the known signal based on the received information. In addition, the base station device may transmit information regarding whether a known signal is inserted (see FIG. 23). If a known signal is inserted, the terminal device may determine that the known signal has been inserted into a resource other than the resource allocated to the terminal device. If it is not inserted, the terminal device may determine that a signal to another terminal device has been transmitted. For example, as a modification of the configuration in FIG. 24, known signals are used instead of terminal device B and terminal device C. When the terminal device A determines that a known signal has been inserted, the terminal device A determines that a known signal has been inserted into a resource other than the resource allocated to the terminal device itself, and decodes the known signal. If the terminal device A determines that a known signal has not been inserted, the terminal device A determines that a signal for another terminal device has been inserted into a resource other than the resource allocated to the subject terminal device.

As described above, according to the present embodiment, when supporting both multi-carrier transmission and single-carrier transmission, it is possible to satisfy the requirement for low PAPR in downlink communication regardless of the operating frequency band. Furthermore, according to the present embodiment, even if the resource allocation of signals addressed to a specific terminal device is not contiguous in the frequency domain, the overall resource allocation of signals addressed to individual terminal devices is contiguous in the frequency domain. Thus, it is possible to allocate discontiguous resources in the frequency domain while suppressing an increase in PAPR. In this way, resources can be allocated more flexibly and the speed and capacity of downlink communication can be further increased.

It should be noted that the above-described embodiments show examples of embodying the present disclosure, and the present disclosure can be implemented in various other forms. For example, various modifications, substitutions, omissions, or combinations thereof are possible without departing from the gist of the present disclosure. Forms with such a modification, substitution, omission, or the like are also included in the scope of the invention described in the claims and their equivalents, as well as being included in the scope of the present disclosure.

In addition, the effects of the present disclosure described herein are merely exemplary and may have other effects.

Note that the present disclosure can also have the following configuration.

[Item 1]

A base station device comprising:

a controller configured to:

notify a terminal device of first information regarding a signal waveform to be used in downlink communication in an initial connection procedure performed with the terminal device among a first signal waveform and a second signal waveform; and perform the downlink communication in the initial connection procedure with the signal waveform to be used based on the first information.

[Item 2]

The base station device according to item 1, wherein the first signal waveform includes a multi-carrier signal, and the second signal waveform includes a single-carrier signal.

[Item 3]

The base station device according to item 1 or 2, further comprising:

a first signal waveform transmitter that generates the first signal waveform and transmits the first signal waveform; and a second signal waveform transmitter that generates the second signal waveform and transmits the second signal waveform, wherein the second signal waveform transmitter generates the second signal waveform using transform precoding, and the first signal waveform transmitter generates the first signal waveform without using the transform precoding.

[Item 4]

The base station device according to item 3, wherein the second signal waveform transmitter combines signals addressed to a plurality of the terminal devices and performs the transform precoding on the combined signals.

[Item 5]

The base station device according to item 3 or 4, wherein the second signal waveform transmitter combines signals addressed to one or a plurality of the terminal devices and a broadcast signal, and performs the transform precoding on the combined signals.

[Item 6]

The base station device according to any one of items 3 to 5, wherein the second signal waveform transmitter performs the transform precoding on signals addressed to the plurality of terminal devices for each terminal device, and maps the transform-precoded signals of the plurality of terminal devices onto contiguous resources in a frequency domain.

[Item 7]

The base station device according to item 6, wherein the second signal waveform transmitter maps the transform-precoded signals of at least one terminal device among the plurality of terminal devices onto non-contiguous resources in the frequency domain.

[Item 8]

The base station device according to any one of items 1 to 7, wherein the first information includes information regarding the number of transmission layers used in the downlink communication.

[Item 9]

The base station device according to any one of items 1 to 8, wherein the controller performs downlink communication with the terminal device using one of the first signal waveform and the second signal waveform, and when switching the one signal waveform to the other of the first signal waveform and the second signal waveform, the controller notifies the terminal device of second information regarding switching of the signal waveform.

[Item 10]

The base station device according to any one of items 1 to 9, wherein when switching the signal waveform to be used from one of the first signal waveform and the second signal waveform to the other, the controller notifies the terminal device of third information regarding a start timing of using the other signal waveform, and based on the third information, the controller switches the signal waveform to be used to the other signal waveform at the start timing.

[Item 11]

The base station device according to any one of items 1 to 10, wherein when switching the signal waveform to be used from one of the first signal waveform and the second signal waveform to the other, the controller notifies the terminal device of fourth information regarding a period in which the other signal waveform is used, and based on the fourth information, the controller perform downlink communication with the terminal device based on the other signal waveform during at least a part of the period.

[Item 12]

The base station device according to item 11, wherein after the period has elapsed, the controller switches the signal waveform used for downlink communication with the terminal device from the other signal waveform to the one signal waveform.

[Item 13]

The base station device according to any one of items 1 to 12, wherein the controller determines one of the first signal waveform and the second signal waveform as a signal waveform to be used for downlink communication with the terminal device according to at least one of altitude and performance of the base station device, and performs the downlink communication with the terminal device using the one signal waveform.

[Item 14]

A terminal device comprising:

a controller configured to:

acquire first information regarding a signal waveform to be used in downlink communication in an initial connection procedure performed with a base station device among a first signal waveform and a second signal waveform; and perform the downlink communication in the initial connection procedure based on the first information.

[Item 15]

The terminal device according to item 14, wherein the first signal waveform includes a multi-carrier signal, and the second signal waveform includes a single-carrier signal.

[Item 16]

The terminal device according to item 14 or 15, wherein the first signal waveform is a signal generated using transform precoding, and the second signal waveform is a signal generated without using the transform precoding.

[Item 17]

The terminal device according to item 15 or 16, further comprising:

a first signal waveform receiver that performs reception processing of the first signal waveform;

a second signal waveform receiver that performs reception processing of the second signal waveform; and a signal waveform switch configured to:

when performing first processing with the base station device, provide a signal received on downlink from the base station device to one of the first signal waveform receiver and the second signal waveform receiver; and when performing second processing different from the first processing with the base station device, provide the signal received on downlink from the base station device to the other of the first signal waveform receiver and the second signal waveform receiver.

[Item 18]

The terminal device according to item 17, wherein the first processing includes at least one of:

synchronization signal transmission/reception processing;

transmission/reception processing of at least one of message 2, message 4 and message B in a random access procedure;

control signal transmission/reception processing; and reference signal transmission/reception processing.

[Item 19]

The terminal device according to item 17 or 18, further comprising:

a first signal waveform receiver that performs reception processing of the first signal waveform;

a second signal waveform receiver that performs reception processing of the second signal waveform; and a signal waveform switch that provides a signal received on downlink from the base station device to one of the first signal waveform receiver and the second signal waveform receiver, wherein the controller acquires information regarding transmission timing of uplink communication to the base station device, and the signal waveform switch determines a signal waveform receiver that provides the received signal from among the first signal waveform receiver and the second signal waveform receiver based on the information regarding the transmission timing.

[Item 20]

A radio communication system comprising a base station device and a terminal device, wherein the base station device includes a first controller configured to notify the terminal device of first information regarding a signal waveform to be used in downlink communication in an initial connection procedure performed with the terminal device among a first signal waveform and a second signal waveform and perform the downlink communication in the initial connection procedure with the signal waveform to be used based on the first information, and the terminal device includes a second controller configured to acquire the first information from the base station device and perform the downlink communication in the initial connection procedure based on the first information.

REFERENCE SIGNS LIST

1 Base station device
2 Terminal device
2A Terminal device
2B Terminal device
3 Relay device (relay station)
4 Terrestrial network
11 Geostationary satellite
12 Low-earth-orbiting satellite
13 Aviation station device
15 Core network
16 Internet
17 Macro cell
18 Femto cell
19 Airborne platform
101 Upper-layer processor
103 Controller
105 Receiver
107 Transmitter
109 Antenna
201 Upper-layer processor
203 Controller
205 Receiver
207 Transmitter
209 Antenna
301 Signal waveform switch
303 First signal waveform receiver
305 Second signal waveform receiver
401 Signal waveform switch
403 First signal waveform transmitter
405 Second signal waveform transmitter
1051 Decoder
1053 Demodulator
1055 Demultiplexer
1057 Radio receiver
1059 Channel measurement unit
1071 Encoder
1073 Modulator
1075 Multiplexer
1077 Radio transmitter
1079 Link reference signal generator
2051 Decoder
2053 Demodulator
2055 Demultiplexer
2057 Radio receiver
2059 Channel measurement unit
2071 Encoder
2073 Modulator
2075 Multiplexer

53

2077 Radio transmitter
2079 Link reference signal generator
3031 CP remover
3033 S/P unit
3035 DFT unit
3037 P/S unit
3051 CP remover
3053 S/P unit
3055 DFT unit
3057 IDFT unit
4031 S/P unit
4033 IDFT unit
4035 P/S unit
4037 CP inserter
4051 DFT unit
4053 IDFT unit
4055 P/S unit
4057 CP inserter

The invention claimed is:

1. A base station device comprising:
a controller configured to:
notify a terminal device of first information regarding a signal waveform to be used in downlink communication in an initial connection procedure performed with the terminal device among a first signal waveform and a second signal waveform; and
perform the downlink communication in the initial connection procedure with the signal waveform to be used based on the first information,
wherein the first signal waveform includes a multi-carrier signal, and the second signal waveform includes a single-carrier signal.

2. The base station device according to claim 1, further comprising:
a first signal waveform transmitter that generates the first signal waveform and transmits the first signal waveform; and
a second signal waveform transmitter that generates the second signal waveform and transmits the second signal waveform, wherein
the second signal waveform transmitter generates the second signal waveform using transform precoding, and
the first signal waveform transmitter generates the first signal waveform without using the transform precoding.

3. The base station device according to claim 2, wherein
the second signal waveform transmitter combines signals addressed to a plurality of the terminal devices and performs the transform precoding on the combined signals.

4. The base station device according to claim 2, wherein
the second signal waveform transmitter combines signals addressed to one or a plurality of the terminal devices and a broadcast signal, and performs the transform precoding on the combined signals.

5. The base station device according to claim 2, wherein
the second signal waveform transmitter performs the transform precoding on signals addressed to a plurality of the terminal devices for each terminal device, and maps the transform-precoded signals of the plurality of terminal devices onto contiguous resources in a frequency domain.

6. The base station device according to claim 5, wherein
the second signal waveform transmitter maps the transform-precoded signals of at least one terminal device among the plurality of terminal devices onto non-contiguous resources in the frequency domain.

7. The base station device according to claim 1, wherein
the first information includes information regarding the number of transmission layers used in the downlink communication.

8. The base station device according to claim 1, wherein
the controller performs downlink communication with the terminal device using one of the first signal waveform and the second signal waveform, and
when switching the one signal waveform to the other of the first signal waveform and the second signal waveform, the controller notifies the terminal device of second information regarding switching of the signal waveform.

9. The base station device according to claim 1, wherein
when switching the signal waveform to be used from one of the first signal waveform and the second signal waveform to the other, the controller notifies the terminal device of third information regarding a start timing of using the other signal waveform, and
based on the third information, the controller switches the signal waveform to be used to the other signal waveform at the start timing.

10. The base station device according to claim 1, wherein
when switching the signal waveform to be used from one of the first signal waveform and the second signal waveform to the other, the controller notifies the terminal device of fourth information regarding a period in which the other signal waveform is used, and
based on the fourth information, the controller perform downlink communication with the terminal device based on the other signal waveform during at least a part of the period.

11. The base station device according to claim 10, wherein
after the period has elapsed, the controller switches the signal waveform used for downlink communication with the terminal device from the other signal waveform to the one signal waveform.

12. The base station device according to claim 1, wherein
the controller determines one of the first signal waveform and the second signal waveform as a signal waveform to be used for downlink communication with the terminal device according to at least one of altitude and performance of the base station device, and performs the downlink communication with the terminal device using the one signal waveform.

13. A terminal device comprising:
a controller configured to:
acquire first information regarding a signal waveform to be used in downlink communication in an initial connection procedure performed with a base station device among a first signal waveform and a second signal waveform; and
perform the downlink communication in the initial connection procedure based on the first information,
wherein the first signal waveform includes a multi-carrier signal, and the second signal waveform includes a single-carrier signal.

14. The terminal device according to claim 13, wherein
the first signal waveform is a signal generated using transform precoding, and
the second signal waveform is a signal generated without using the transform precoding.

15. The terminal device according to claim 13, further comprising:

a first signal waveform receiver that performs reception processing of the first signal waveform;

a second signal waveform receiver that performs reception processing of the second signal waveform; and a signal waveform switch configured to:

when performing first processing with the base station device, provide a signal received on downlink from the base station device to one of the first signal waveform receiver and the second signal waveform receiver; and when performing second processing different from the first processing with the base station device, provide the signal received on downlink from the base station device to the other of the first signal waveform receiver and the second signal waveform receiver.

16. The terminal device according to claim 15, wherein the first processing includes at least one of:

synchronization signal transmission/reception processing;

transmission/reception processing of at least one of message 2, message 4 and message B in a random access procedure;

control signal transmission/reception processing; and reference signal transmission/reception processing.

17. The terminal device according to claim 15, further comprising:

a first signal waveform receiver that performs reception processing of the first signal waveform;

a second signal waveform receiver that performs reception processing of the second signal waveform; and a signal waveform switch that provides a signal received on downlink from the base station device to one of the first signal waveform receiver and the second signal waveform receiver, wherein the controller acquires information regarding transmission timing of uplink communication to the base station device, and the signal waveform switch determines a signal waveform receiver that provides the received signal from among the first signal waveform receiver and the second signal waveform receiver based on the information regarding the transmission timing.

18. A radio communication system comprising a base station device and a terminal device, wherein the base station device includes a first controller configured to notify the terminal device of first information regarding a signal waveform to be used in downlink communication in an initial connection procedure performed with the terminal device among a first signal waveform and a second signal waveform and perform the downlink communication in the initial connection procedure with the signal waveform to be used based on the first information, and the terminal device includes a second controller configured to acquire the first information from the base station device and perform the downlink communication in the initial connection procedure based on the first information, wherein the first signal waveform includes a multi-carrier signal, and the second signal waveform includes a single-carrier signal.

\* \* \* \* \*